(12) United States Patent
Chu et al.

(10) Patent No.: US 9,473,042 B1
(45) Date of Patent: Oct. 18, 2016

(54) GRID ACTIVE POWER FILTERS USING CASCADED MULTILEVEL INVERTERS WITH SWITCHING ANGLE CONTROL

(71) Applicants: Yongbin Chu, San Antonio, TX (US); Shuo Wang, Gainesville, FL (US)

(72) Inventors: Yongbin Chu, San Antonio, TX (US); Shuo Wang, Gainesville, FL (US)

(73) Assignee: BOARD OF REGENTS, THE UNIVERSITY OF TEXAS SYSTEM, Austin, TX (US)

( * ) Notice: Subject to any disclaimer, the term of this patent is extended or adjusted under 35 U.S.C. 154(b) by 0 days.

(21) Appl. No.: 14/660,121

(22) Filed: Mar. 17, 2015

Related U.S. Application Data

(60) Provisional application No. 61/954,109, filed on Mar. 17, 2014.

(51) Int. Cl.
| | | |
|---|---|---|
| *H02M 1/12* | (2006.01) | |
| *H02M 7/49* | (2007.01) | |
| *H02M 7/483* | (2007.01) | |
| *H02M 7/44* | (2006.01) | |
| *H02M 1/42* | (2007.01) | |

(52) U.S. Cl.
CPC ............... *H02M 7/44* (2013.01); *H02M 1/12* (2013.01); *H02M 1/42* (2013.01)

(58) Field of Classification Search
CPC .. H02M 1/4216; H02M 1/4233; H02M 1/12; H02M 7/49; H02M 2007/4835
USPC ..................................... 363/40, 95; 323/207
See application file for complete search history.

(56) References Cited

U.S. PATENT DOCUMENTS

| | | | | |
|---|---|---|---|---|
| 6,075,350 A | * | 6/2000 | Peng ..................... | H02J 3/1814 323/207 |
| 6,088,245 A | * | 7/2000 | Ainsworth ............ | H02J 3/1857 363/39 |
| 6,657,322 B2 | * | 12/2003 | Skibinski .............. | H02J 3/1842 307/105 |
| 2013/0033907 A1 | * | 2/2013 | Zhou ...................... | H02M 1/12 363/37 |
| 2015/0333612 A1 | * | 11/2015 | Hasler .................... | H02M 1/12 363/39 |

\* cited by examiner

*Primary Examiner* — Timothy J Dole
*Assistant Examiner* — Sisay G Tiku
(74) *Attorney, Agent, or Firm* — Thomas|Horstemeyer, LLP.

(57) ABSTRACT

Various methods and systems are provided for active power filtering utilizing cascaded multilevel inverters. In one example, among others, a grid active power filter includes a multilevel inverter including a plurality of series connected H-bridges and processing circuitry configured to control switching of the plurality of H-bridges. The multilevel inverter can be coupled to a point of common coupling between a grid and a load. The switching can be controlled based at least in part upon a number of individual harmonic currents drawn by the load. In another example, a method includes determining firing angles for each of a series of single phase H-bridges coupled to a PCC between a grid and a load, and adjusting firing of switches of the single phase H-bridges based upon the firing angles. The firing angles can be based at least in part upon a number of individual harmonic currents drawn by the load.

20 Claims, 16 Drawing Sheets

GRID ACTIVE POWER FILTERS USING CASCADED MULTILEVEL INVERTERS WITH SWITCHING ANGLE CONTROL

CROSS REFERENCE TO RELATED APPLICATIONS

This application claims priority to, and the benefit of, U.S. provisional application entitled "Grid Active Power Filters Using Cascaded Multilevel Inverters with Direct Asymmetric Switching Angle Control for Grid Support Functions" having Ser. No. 61/954,109, filed Mar. 17, 2014, which is hereby incorporated by reference in its entirety.

BACKGROUND

Non-linear components such as diodes, thyristors, current/voltage source converters, switched mode power supplies, and motor drives are widely used in power systems. They can generate harmonics and reactive power which greatly degrades power quality. In addition, the presence of large unbalanced industrial loads such as single phase traction systems, electrical furnaces and welding machines can produce significant current and voltage distortions in the power systems. There are several deleterious effects of high distortion in the current or voltage waveforms and poor power factor. These conditions can increase power loss, cause vibrations and noise in motors, result in malfunction and failure of sensitive equipment, etc. Harmonic currents may also cause resonance between shunt capacitance and series inductance of the distribution and transmission lines. For at least these reasons, standards such as IEEE-519 have placed several limits on both consumers and utilities.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
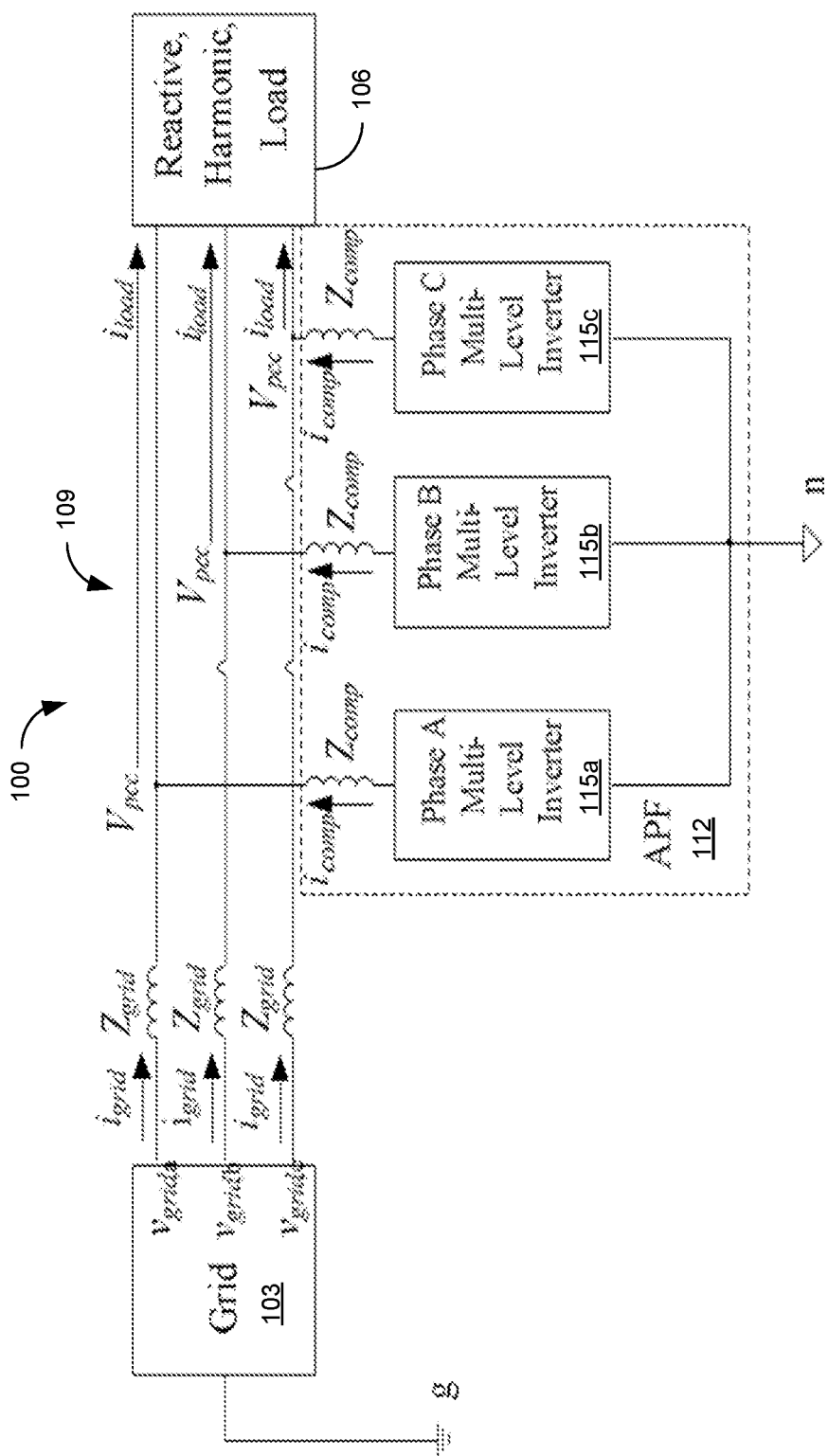
FIG. 1 is a graphical representation of an example of a power system topology including an active power filter (APF) in accordance with various embodiments of the present disclosure.

Disclosed herein are various embodiments of methods related to cascaded multilevel inverters that can be used in active power filtering. Reference will now be made in detail to the description of the embodiments as illustrated in the drawings, wherein like reference numbers indicate like parts throughout the several views.

Traditionally, passive filters have been used to compensate for harmonics and reactive power in power systems, but passive filters are large in size, have aging problems and may resonate with the supply impedance. On the other hand, as more industrial and commercial applications such as the superfast charging stations utilize medium and high voltages provided through the power systems, the implementation of passive filters becomes more difficult.

Multilevel inverter based active power filters, which have the ability to synthesize a high voltage with low voltage components, have been designed to simultaneously compensate for harmonics and suppress reactive power, and numerous control techniques have been proposed by many researchers. These control methods of multilevel inverter based active power filters (APFs) can be categorized into ABC-frame current reference generation, DQ-frame current reference generation, and prediction based current reference generation. ABC-frame current reference generation obtains the reference current based on the currents and voltages in the ABC-frame. DQ-frame current reference generation transforms the ABC-frame current and voltage into the DQ-frame and acquires the reference current based on the D and Q components of the current. This is a linear algorithm, which is easier to model than the ABC-frame method. Prediction based current reference generation can eliminate the delay present in the previous two current reference identification schemes. The delay is a result of sampling the measurement signal and execution of the digital control algorithm.

While these control techniques can compensate for the harmonics and reactive power to some extent, they only reduce overall harmonics and reactive power, but have no control over a specific order of harmonic. In addition, the performance of these control methods can be ensured only at high switching frequencies. However, a high switching frequency will increase switching losses and complicate thermal management of the power system, especially in high voltage and high power density applications. Furthermore, even though most of these control techniques can compensate harmonics and reactive power simultaneously, few of them can balance unbalanced loads at the same time.

The present disclosure presents a switching angle control technique for cascaded multilevel inverters, which can achieve harmonic and reactive power compensation while simultaneously balancing for unbalanced loads. Unlike existing control strategies which work in the time domain and focus on reducing the overall harmonics and reactive power without differentiating individual harmonics, the switching angle control technique works in the frequency domain and can efficiently compensate for individual harmonics and reactive power apart from balancing unbalanced load. The switching angle control technique can compensate for harmonics and reactive power and balance unbalanced load with direct asymmetric firing angle and conduction angle control for H-bridges of the cascaded multilevel inverter.

Referring to FIG. 1, shown is an example of a power system topology 100 that provides power from a grid 103 to a load 106 via a three-phase distribution network 109. The power system topology 100 includes an active power filter (APF) 112 comprising a three-phase cascaded multilevel inverter 115 that is coupled to the distribution network 109 at a point of common coupling (PCC) between the gird 103 and the load 106. $Z_{grid}$ and $Z_{comp}$ represent the impedance between grid 106 and the PCC and the impedance between APF 112 and PCC, respectively.

Figure 2:
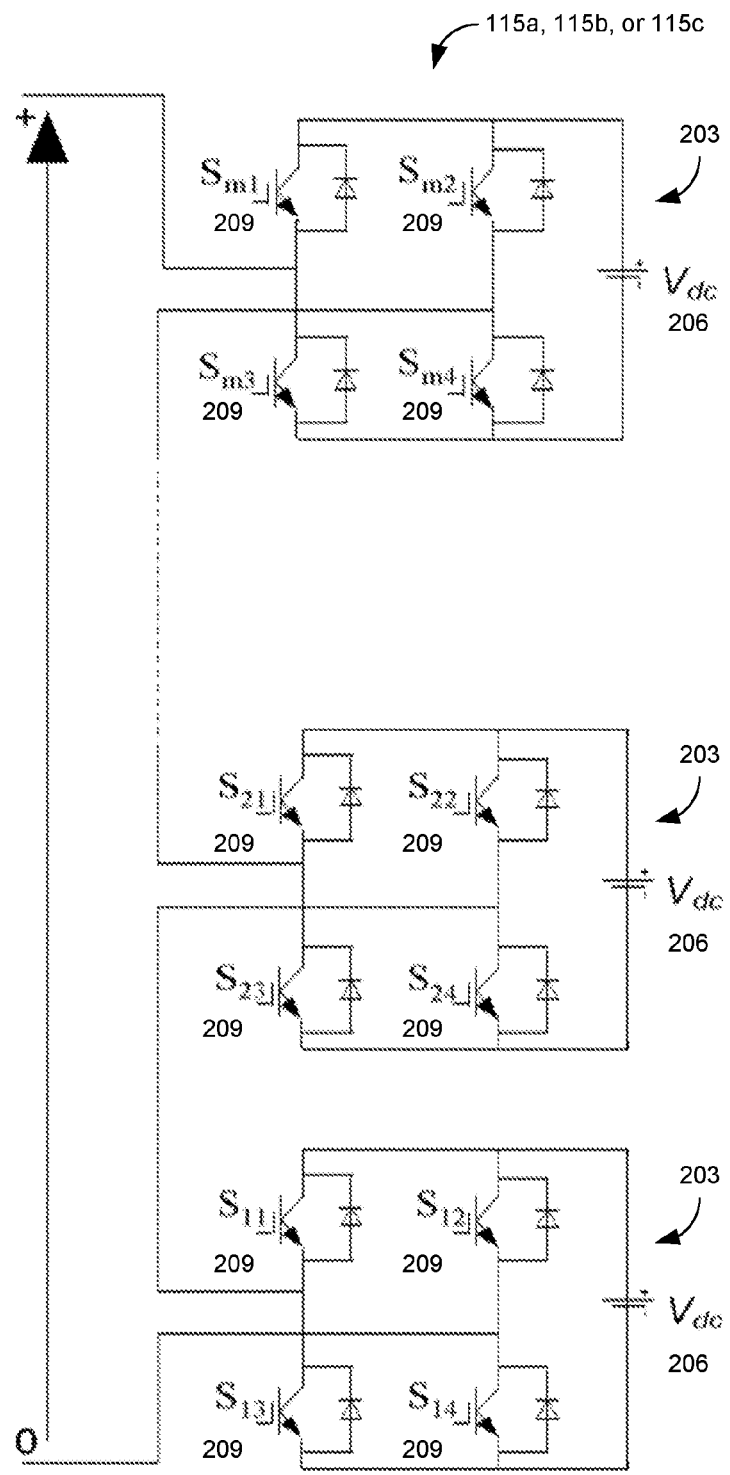
FIG. 2 is a schematic representation of an example of a single-phase topology of a cascaded multilevel inverter of the APF of FIG. 1 in accordance with various embodiments of the present disclosure.

FIG. 2 shows an example of one phase (115a, 115b or 115c of FIG. 1) of the three-phase cascaded multilevel inverter 115. The inverter phase 115a/115b/115c comprises a plurality of m series connected, single phase H-bridges 203. The cascaded multilevel inverter 115 is modular in nature and can be easily extended to include any number of H-bridge 203 levels to satisfy the application. Each H-bridge 203 includes a DC source 206 and an array of switches ($S_{m1}$-$S_{m4}$) 209. The separate DC sources 206 can be obtained from batteries, solar cells, ultra-capacitors, high frequency isolated converters, and/or other appropriate DC power source. The switches 209 of the H-bridge 203 can be controlled to generate three different voltages at the output of the H-bridge 203: $+V_{dc}$, 0 and $-V_{dc}$.

By controlling the firing and conduction angles of the switches 209 of the cascaded multilevel inverters 115, compensation can be provided for reactive and individual harmonic currents under balanced and unbalanced conditions. Based on measured active, reactive and individual harmonic currents drawn by the load 106, desired firing and conduction angles for the switches 209 of each H-bridge 203 of the multilevel inverter 115 can be derived and used to adjust the current firing and conduction angles. Instead of working in the time domain, this switching angle control technique works in the frequency domain. By working in the frequency domain, specific orders of harmonics can be controlled to ensure compliance with the standards. Also, the same compensation effect can be achieved using a much lower switching frequency than that of conventional methods. The lower switching frequency will greatly reduce switching losses of the multilevel inverters 115. In addition, unbalanced load can be balanced with the switching angle control technique.

Figure 3:
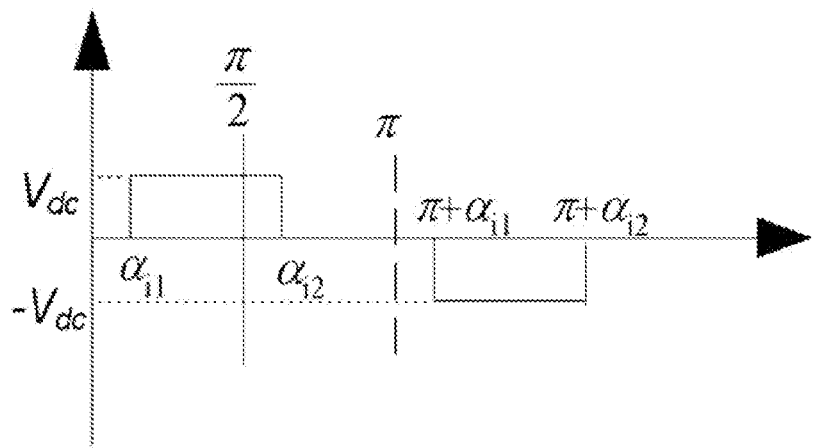
FIG. 3 is an example of an H-bridge output voltage waveform of the cascaded multilevel inverter of FIG. 2 in accordance with various embodiments of the present disclosure.

Referring next to FIG. 3, shown is an example of an output voltage waveform of one of the H-bridges 203. At firing angle $\alpha_{i1}$, switches $S_{m1}$ and $S_{m4}$ (FIG. 2) are turned on to apply the DC source voltage $+V_{dc}$ across the output of the H-bridge 203 until $\alpha_{i2}$. The switches remain turned off until $\pi+\alpha_{i1}$ is reached, where switches $S_{m2}$ and $S_{m3}$ (FIG. 2) are turned on to apply the DC source voltage $-V_{dc}$ across the output of the H-bridge 203. The Fourier series of the output voltage waveform can be expressed as:

$$v(t) = \frac{1}{2}a_0 + \sum_{n=1}^{\infty}(a_n\cos(\omega_n t) + b_n\sin(\omega_n t)), \qquad (1)$$

where $\omega_n$ is $$n\frac{2\pi}{T},$$

T is the time period of one cycle of the waveform, $\omega=\omega_1$ and:

$$a_n = \frac{1}{\pi}\int_{-\pi}^{\pi} f(\omega t)\cos(n\omega t)d\omega t, \text{ and} \qquad (2)$$

$$b_n = \frac{1}{\pi}\int_{-\pi}^{\pi} f(\omega t)\sin(n\omega t)d\omega t. \qquad (3)$$

It should be pointed out that $\alpha_{i1}$ and $\alpha_{i2}$ in FIG. 2 are asymmetrical to $\pi/2$. The firing angle and conduction angle are mostly asymmetrical to $\pi/2$ except under special conditions. However, since the waveform of FIG. 2 is rotationally symmetric to $(\pi, 0)$, even-numbered components $a_{n\_i}$ and $b_{n\_i}$ are zero, and odd-numbered components $a_{n\_i}$ and $b_{n\_i}$ can be expressed as:

$$a_{n\_i} = \frac{2V_{dc}}{n\pi}[\sin(n\alpha_{i2}) - \sin(n\alpha_{i1})], \text{ and} \qquad (4)$$

$$b_{n\_i} = \frac{2V_{dc}}{n\pi}[\cos(n\alpha_{i1}) - \cos(n\alpha_{i2})], \qquad (5)$$

where $0<\alpha_{i1}, \alpha_{i2}<\pi$. Since there are m series connected H-bridges 203 in FIG. 1, the odd-numbered components $a_n$ and $b_n$ for the total output voltage of the cascaded inverter phase 115a/115b/115c can be defined by:

$$a_n = \sum_{i=1}^{m}\frac{2V_{dc}}{n\pi}[\sin(n\alpha_{i2}) - \sin(n\alpha_{i1})], \text{ and} \qquad (6)$$

$$b_n = \sum_{i=1}^{m}\frac{2V_{dc}}{n\pi}[\cos(n\alpha_{i1}) - \cos(n\alpha_{i2})]. \qquad (7)$$

The switching angle control technique is based on the assumption that, in steady state, the load current of adjacent fundamental cycles can be considered the same. From a sensed current drawn by the load 106 (e.g., $i_{load}$ of FIG. 1) of the last, previous or preceding cycle; the active current ($i_{act}$), reactive current ($i_{ract}$), and harmonic currents ($i_h$) can be derived through Fourier analysis of the sampled load current. If the power system is balanced, to compensate for reactive power and harmonics, the grid 103 (FIG. 1) should provide the active current ($i_{grid}=i_{act}$) and the APF 112 (FIG. 1) should provide a compensation current for the reactive and harmonic currents ($i_{comp}=i_{ract}+i_h$). Based on the grid voltage ($V_{grid}$), the active current ($i_{act}$) that needs to be provided by the grid 103, and the grid impedance ($Z_{grid}$), the PCC voltage ($V_{pcc}$) can be expressed as:

$$V_{pcc}=V_{grid}-i_{act}Z_{grid}. \tag{8}$$

The voltage reference of the fundamental frequency ($V_{1\_reference}$) for the multilevel inverter 203 can then be derived from $V_{pcc}$, $i_{ract}$ and the compensation impedance ($Z_{comp}$), using:

$$V_{1\_reference}=V_{pcc}-i_{ract}Z_{comp}. \tag{9}$$

If the grid 103 only provides active current ($i_{grid}=i_{act}$), the PCC voltage ($V_{pcc}$) only includes the fundamental frequency component. Therefore, the voltage references ($V_{n\_reference}$) for the multilevel inverter 115 to compensate for the order of harmonics (n>1) can be obtained based on the harmonic currents ($i_{h-n}$), and $Z_{comp}$, which can be seen from:

$$V_{n\_reference}=i_{h-n}Z_{comp}. \tag{10}$$

After the voltage references ($V_{n\_reference}$), where (n≥1), for the multilevel inverter 115 are obtained, the coefficients $a_{n\_reference}$ and $b_{n\_reference}$ for the multilevel inverter 115 can be obtained from the real part and imaginary part of ($V_{n\_reference}$). When the power system of FIG. 1 is balanced, triple-n orders of harmonics (e.g., 3, 6, 9 . . . ) are zero. Therefore, the harmonics to be mitigated are odd, non-triple-n harmonics (e.g., 5, 7, 11, 13, 17 . . . ). To remove lower order harmonics and compensate for the reactive current, $a_n$ and $b_n$ generated by the multilevel inverter 115 should equal $a_{n\_reference}$ and $b_{n\_reference}$. Thus, the firing angles $\alpha_{i1}$ and $\alpha_{i2}$ of each H-bridge 209 in the cascaded multilevel inverters 115 of FIG. 2 can be given by the following equations.

$$\frac{2V_{dc}}{\pi}[\sin(\alpha_{12})-\sin(\alpha_{11})+\sin(\alpha_{22})-\sin(\alpha_{21})\ldots \tag{11}$$

$$\sin(\alpha_{m2})-\sin(\alpha_{m1})]=a_{1-reference}$$

$$\frac{2V_{dc}}{\pi}[\cos(\alpha_{11})-\cos(\alpha_{12})+\cos(\alpha_{21})-\cos(\alpha_{22})\ldots$$

$$\cos(\alpha_{m1})-\cos(\alpha_{m2})]=b_{1-reference}$$

$$\frac{2V_{dc}}{5\pi}[\sin(5\alpha_{12})-\sin(5\alpha_{11})+\sin(5\alpha_{22})-\sin(5\alpha_{21})\ldots$$

$$\sin(5\alpha_{m2})-\sin(5\alpha_{m1})]=a_{5-reference}$$

$$\frac{2V_{dc}}{5\pi}[\cos(5\alpha_{11})-\cos(5\alpha_{12})+\cos(5\alpha_{21})-\cos(5\alpha_{22})\ldots$$

$$\cos(5\alpha_{m2})-\cos(5\alpha_{m1})]=b_{5-reference}$$

In equations (11), the right side includes the voltage references for the multilevel inverter 115 in the frequency domain and the left side includes the voltages synthesized by the multilevel inverter 113, which are also in the frequency domain. As equations (11) show, since the references and actual value for the fundamental component and each order of harmonic are separated, the reactive power and each order of harmonic can be controlled individually. Ideally, if the exact solution of the equations (11) can be found, the low order harmonic and reactive currents can be eliminated and the highest order that can be eliminated is a function of the number (m) of the H-bridges 209 in the multilevel inverter 115. For a balanced, three phase system, if m is odd, then the order is 3m−2; and if m is even, then the order is 3m−1.

If the power system of FIG. 1 is unbalanced, the switching angle control technique is similar to the balanced case with two differences. The first difference is that the active current, reactive current and harmonic currents drawn by the load 106 are different between the three phases. To balance the power system, a balanced active current that the grid 103 is to supply should first be chosen. This active current is the same for the three phases. Then, $a_{n\_reference}$ and $b_{n\_reference}$ can be derived using method similar to the balanced case. However, since the reactive and harmonic currents drawn by the load 106 of the three phases are different, the calculated voltage reference $a_{n\_reference}$ and $b_{n\_reference}$ for the multilevel inverter 115 are different for the different phases. Thus, the references are calculated separately. In addition, since the power system is unbalanced, the triple-n orders of harmonics are non-zero, which should also be taken care of. Thus, the harmonics that need to be mitigated in the unbalanced case are all odd harmonics. The equations (12) show how to compute the firing angles $\alpha_{i1}$ and $\alpha_{i2}$ of each H-bridge 203 in the cascaded multilevel inverter 115a (FIG. 1) of phase A. For the other two phases, only the voltage reference needs to be changed and the equations (12) can still be applied. From equations (12), it can be see that the highest order of harmonics the cascaded multilevel inverter can compensate is 2m−1 in unbalanced case.

$$\frac{2V_{dc}}{\pi}[\sin(\alpha_{12})-\sin(\alpha_{11})+\sin(\alpha_{22})-\sin(\alpha_{21})\ldots \tag{12}$$

$$\sin(\alpha_{m2})-\sin(\alpha_{m1})]=a_{1-reference\_a}$$

$$\frac{2V_{dc}}{\pi}[\cos(\alpha_{11})-\cos(\alpha_{12})+\cos(\alpha_{21})-\cos(\alpha_{22})\ldots$$

$$\cos(\alpha_{m1})-\cos(\alpha_{m2})]=b_{1-reference\_a}$$

$$\frac{2V_{dc}}{3\pi}[\sin(3\alpha_{12})-\sin(3\alpha_{11})+\sin(3\alpha_{22})-\sin(3_{21})\ldots$$

$$\sin(3\alpha_{m2})-\sin(3\alpha_{m1})]=a_{3-reference\_a}$$

$$\frac{2V_{dc}}{3\pi}[\cos(3\alpha_{11})-\cos(3\alpha_{12})+\cos(3\alpha_{21})-\cos(3\alpha_{22})\ldots$$

$$\cos(3\alpha_{m2})-\cos(3\alpha_{m2})]=b_{3-reference\_a}$$

In the balanced case, if the grid current ($i_{grid}$) is equal to the active current ($i_{act}$) drawn by the load 106 (FIG. 1), the net power flowing into or out of the APF 112 (FIG. 1) is zero, and no power flows into or out of a given phase. In the unbalanced case, if the average value of the active current of the three phases drawn by the load 106 is chosen as the active current ($i_{act}$) the grid 103 (FIG. 1) needs to supply, and the net power flowing into the APF 112 is still zero while there is a certain amount of power that flows into or out of a given phase of the APF 112. However, the grid current ($i_{grid}$) in both balanced and unbalanced cases can be intentionally manipulated to effect a net power flow into or out of the APF 112. For example, if the maximum active current of the three phases drawn by the load 106 is chosen as the current that the grid is to supply, then there will be active power that flows into the APF 112 of the other two phases with smaller active current drawn by the load 106. As a result, this technique can also be used to integrate renewable sources such as photovoltaics and/or wind turbines to the grid 103 while still provide grid support functions.

Because the equations in (11) and (12) are transcendental, conventional numerical techniques are not effective because of the large number of unknown variables, multiple local optima, and the difficulty in finding good initial values. In this case, a genetic algorithm (GA) can be used to overcome the limitations of conventional numerical methods and find the firing and conduction angles of each H-bridge 203 in the cascaded multilevel inverters 115.

GA is a technique inspired by the mechanisms of natural evolution, where individuals are constantly changing in a competing environment in order to survive. It assumes that any potential solution of one problem can be represented by a set of parameters, which are regarded as genes of a chromosome and can be coded as a population of strings. A fitness value, which is positive and highly related with its objective function, is used to reflect the "goodness" of the chromosome. Through generations, it is expected that the quality of the population will tend to improve and the solution of the problem will be optimized. In this application, the chromosomes represent the potential solutions of the switching angles, and each chromosome has a certain number of genes, corresponding to the firing angle and conduction angle of each H-bridge 203 in the multilevel inverter 115. If the power system is balanced, the objective function can be defined as equation (13) or equation (14) based on whether the number (m) of H-bridge 203 in the cascaded multilevel inverter 115 is even or odd.

$$F_{obj} = C_1(|a_{1-reference} - a_1| + |b_{1-reference} - b_1|) + \quad (13)$$
$$C_2(|a_{5-reference} - a_5| + |b_{5-reference} - b_5|) + \ldots +$$
$$C_m(|a_{3m-1-reference} - a_{3m-1}| + |b_{3m-1-reference} - b_{3m-1}|) \text{ (m is even)},$$

$$F_{obj} = C_1(|a_{1-reference} - a_1| + |b_{1-reference} - b_1|) + \quad (14)$$
$$C_2(|a_{5-reference} - a_5| + |b_{5-reference} - b_5|) + \ldots +$$
$$C_m(|a_{3m-2-reference} - a_{3m-2}| + |b_{3m-2-reference} - b_{3m-2}|) \text{ (m is odd)}.$$

If the power system is unbalanced, the objective function of one phase can be defined as:

$$F_{obj} = C_1(|a_{1-reference} - a_1| + |b_{1-reference} - b_1|) + \quad (15)$$
$$C_2(|a_{3-reference} - a_3| + |b_{3-reference} - b_3|) + \ldots +$$
$$C_m(|a_{2m-1-reference} - a_{2m-1}| + |b_{2m-1-reference} - b_{2m-1}|).$$

In the equations of (13), (14) and (15), $C_1, C_2 \ldots C_m$ are weight factors and they usually satisfy $C_1 > C_2 \ldots > C_m$ to prioritize the synthesis of the fundamental and low order harmonics over high order harmonics.

Genetic algorithm includes three genetic operators: selection, crossover and mutation, and is implemented with the following operations:

Randomly generate an initial population between the minimum and maximum limits set by the problem, which are $0 < \alpha_{i1}, \alpha_{i2} < \pi$ for this case.

Calculate the fitness value of each individual string. The fitness value in this case attempts to minimize the objective function.

Select chromosomes from the parent population with a probability proportional to their fitness to form offspring chromosomes. The selection scheme used here is Roulette Wheel selection.

Crossover the parents with the crossover probability.

Mutate each offspring with the mutation probability.

Return to calculating fitness values until the desired termination criterion is met or the maximum iteration count is reached.

After the minimization of the objective function through the generations, the firing and conduction angles can be found with the constraints of $0 < \alpha_{i1} < \pi$ and $0 < \alpha_{i2} < \pi$. If the optimization results for $\alpha_{i1}$ and $\alpha_{i2}$ meet the condition $0 < \alpha_{i1} < \alpha_{i2} < \pi$ the $i^{th}$ bridge generates $+V_{dc}$ between $\alpha_{i1}$ and $\alpha_{i2}$ and $-V_{dc}$ between $\pi + \alpha_{i1}$ and $\pi + \alpha_{i2}$, as shown in FIG. 3. If the optimization results $\alpha_{i1}$ and $\alpha_{i2}$ meet the condition that $0 < \alpha_{i1} < \alpha_{i2} < \pi$, the $i^{th}$ bridge generate $-V_{dc}$ between $\alpha_{i1}$ and $\alpha_{i2}$ and $+V_{dc}$ between $\pi + \alpha_{i2}$ and $\pi + \alpha_{i1}$.

To efficiently compensate for the reactive power and harmonics, the difference ($i_{err}$) between the output currents of the APF 112 and the current reference for the APF 112 should be as small as possible. To ensure this, the value of $Z_{comp}$ should not be too large or too small. If $Z_{comp}$ is too small, a small difference between the reference voltage and actual voltage of the multilevel inverter 115 will lead to a large $i_{err}$. In addition, uncontrolled high order harmonics may also be large. If $Z_{comp}$ is too big, which will increase the voltage reference for the multilevel inverter 115; there may be no solution for the equations of (11) and (12). For example, demanding an output voltage higher than the highest voltage that a cascaded multilevel inverter 115 can supply is impossible.

Figure 4:
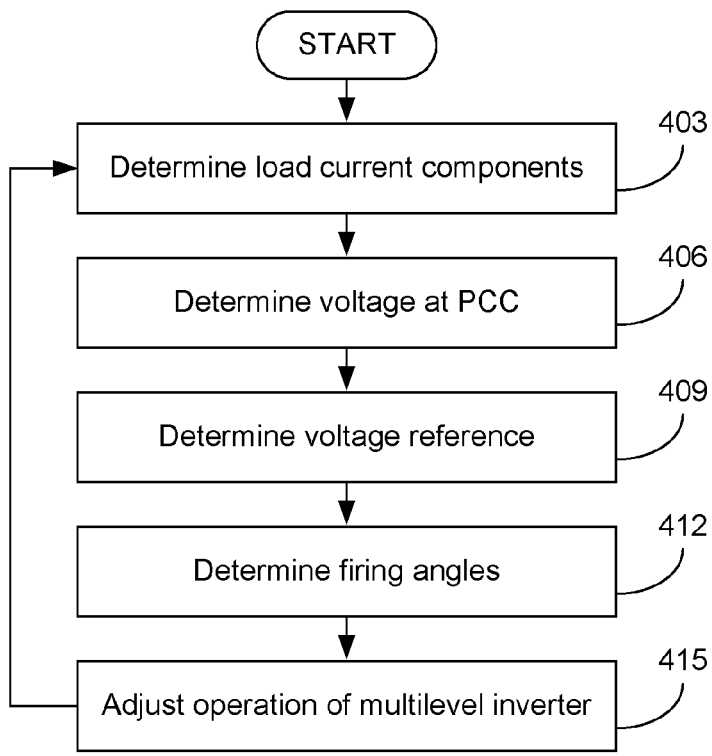
FIG. 4 is a flow chart illustrating an example of switching angle control of the cascaded multilevel inverter of FIG. 2 in accordance with various embodiments of the present disclosure.

When the power system is balanced, the amplitudes of variables of the three phases are the same, so the three phases will not be differentiated and the control technique is equally applicable to any phase. Referring to FIG. 4, shown is a flow chart illustrating an example of the switching angle control technique for reactive and harmonic current compensation with the APF 112. Beginning with 403, load current components are determined. From the sensed current drawn by the load ($i_{load}$) of last, previous or preceding cycle, the active current ($i_{act}$), reactive current ($i_{ract}$), and harmonics current ($i_h$) can be derived through Fourier analysis.

Voltages at the point of common coupling (PCC) can be determined at 406. $v_{pcc}$ can be obtained based on the active current that needs to be provided by the grid 103, $i_{grid}$, and the grid impedance, $Z_{grid}$, based on:

$$v_{pcc} = v_{grid} - i_{grid} Z_{grid} \quad (16)$$

Sometimes, $Z_{grid}$ cannot be easily obtained. In these cases, $v_{pcc}$ can be directly measured or monitored using sensors, which will not affect the switching angle control technique. If there is no active current flowing through the APF 112, $i_{grid}$ equal to $i_{act}$. If there is active current flowing through the APF 112, $i_{grid}$ can be chosen based on the power inject into or withdrawn from the APF 112.

Next, voltage references can be determined at 409. When there is no active current flowing through the APF 112, such as when there is no net power injected into or flowing out of the APF 112, the voltage reference of the fundamental frequency ($v_{1\_reference}$) for the multilevel inverter 115 can be derived from $v_{pcc}$, $i_{ract}$ and $Z_{comp}$ at the fundamental frequency according to:

$$v_{1\_reference} = v_{pcc} - i_{ract} Z_{comp}. \quad (17)$$

When there is active current flowing through the APF, the voltage reference of the fundamental frequency ($v_{1\_reference}$) for the multilevel inverter 115 will be:

$$v_{1\_reference} = v_{pcc} - (i_{ract} + i_{comp\_act})Z_{comp}. \quad (17)$$

where $i_{comp\_act}$ is the active current flowing through the APF 112, which is equal to ($i_{act} - i_{grid}$). In this case, the net power injected into or flowing out of the APF 112 is:

$$P_{net} = 3V_{pcc}I_{comp\_act}/2. \quad (19)$$

where the $V_{pcc}$ and $I_{comp\_act}$ are the amplitude of $v_{pcc}$ and $i_{comp\_act}$.

At 412, the firing angles of the H-bridges 203 are determined. After the voltage reference ($v_{reference}$), for the multilevel inverter 115 is obtained, $a_{n\_reference}$ and $b_{n\_reference}$ for the multilevel inverter 115 can be acquired from $V_{reference}$. Since the system is balanced, triple-n orders of harmonics are zero. Therefore, the harmonics to be mitigated are odd, non-triple-n harmonics (5, 7, 11, 13, 17 . . . ). To remove low order harmonics and compensate reactive currents, $a_n$ and $b_n$ generated by the multilevel inverter should equal $a_{n\_reference}$ and $b_{n\_reference}$. Thus, the firing angles $\alpha_{i1}$ and $\alpha_{i2}$ of each H-bridge 203 in the cascaded multilevel inverter 115 are given by:

$$\frac{2V_{dc}}{\pi}[\sin(\alpha_{12}) - \sin(\alpha_{11}) + \sin(\alpha_{22}) - \sin(\alpha_{21}) \ldots \quad (20)$$
$$\sin(\alpha_{m2}) - \sin(\alpha_{m1})] = a_{1-reference}$$

$$\frac{2V_{dc}}{\pi}[\cos(\alpha_{11}) - \cos(\alpha_{12}) + \cos(\alpha_{21}) - \cos(\alpha_{22}) \ldots$$
$$\cos(\alpha_{m1}) - \cos(\alpha_{m2})] = b_{1-reference}$$

$$\frac{2V_{dc}}{5\pi}[\sin(5\alpha_{12}) - \sin(5\alpha_{11}) + \sin(5\alpha_{22}) - \sin(5\alpha_{21}) \ldots$$
$$\sin(5\alpha_{m2}) - \sin(5\alpha_{m1})] = a_{5-reference}$$

$$\frac{2V_{dc}}{5\pi}[\cos(5\alpha_{11}) - \cos(5\alpha_{12}) + \cos(5\alpha_{21}) - \cos(5\alpha_{22}) \ldots$$
$$\cos(5\alpha_{m2}) - \cos(5\alpha_{m1})] = b_{5-reference}$$

An intelligent algorithm such as, e.g., a genetic algorithm or other appropriate mathematic method can be used to obtain the firing angles $\alpha_{i1}$ and $\alpha_{i2}$ of each H-bridge 203 to control the multilevel inverter 115. At 415, the operation of the multilevel inverter 115 is adjusted based upon the firing angles and the process can return to 403 for subsequent monitoring and adjustment of the APF 112.

When the power system is unbalanced, the amplitudes of variables of the three phases are different. Referring again to FIG. 4, shown is a flow chart illustrating an example of the switching angle control technique for reactive and harmonic current compensation and load balancing with the APF 112. The control technique is similar to the balanced case except that the amplitudes of the variables of the three phases are different. Beginning with 403, load current components are determined. From the sensed current drawn by the load, $i_{load\_a}$, $i_{load\_b}$ and $i_{load\_c}$ of last, previous or preceding cycle, the active current, $i_{act\_a}$, $i_{act\_b}$ and $i_{act\_c}$, reactive current, $i_{ract\_a}$, $i_{ract\_b}$ and $i_{ract\_c}$ and harmonics current, $i_{h\_n\_a}$, $i_{h\_n\_b}$ and $i_{h\_n\_c}$ can be derived through Fourier analysis.

Voltages at the point of common coupling (PCC) can be determined at 406. $v_{pcc}$ can be obtained based on the active current ($i_{act}$) that needs to be provided by the grid 103, $i_{grid}$, and the grid impedance, $Z_{grid}$ based on equation (16). If $Z_{grid}$ cannot be easily obtained, $v_{pcc}$ can be directly measured or monitored using sensors, which will not affect the switching angle control technique. If there is no active current flowing through the APF 112, the amplitude of $i_{grid}$ equal to $(I_{act\_a} + I_{act\_b} + I_{act\_c})/3$, where $I_{act\_a}$, $I_{act\_b}$ and $I_{act\_c}$ are the amplitudes of $i_{act\_a}$, $i_{act\_b}$ and $i_{act\_c}$. If there is active current flowing through the APF 112, $i_{grid}$ can be chosen based on the power injected into or withdrawn from the APF 112.

Next, voltage references can be determined at 409. When there is no active current flowing through the APF 112, such as when there is no net power injected into or flowing out of the APF 112, the voltage reference of fundamental frequency ($v_{1\_reference\_a}$, $v_{1\_reference\_b}$, $v_{1\_reference\_c}$) for the multilevel inverter 115 can be derived for $v_{pcc\_a}$, $v_{pcc\_b}$, $v_{pcc\_c}$, $i_{ract\_a}$, $i_{ract\_b}$, $i_{ract\_c}$ and $Z_{comp}$ at the fundamental frequency according to:

$$v_{1-reference\_a} = v_{pcc\_a} + (i_{ract\_a} + i_{comp\_act\_a})Z_{comp} \quad (21)$$
$$v_{1-reference\_b} = v_{pcc\_b} + (i_{ract\_b} + i_{comp\_act\_b})Z_{comp}$$
$$v_{1-reference\_c} = v_{pcc\_c} + (i_{ract\_c} - i_{comp\_act\_c})Z_{comp}$$

where $i_{comp\_act\_a}$, $i_{comp\_act\_b}$, $i_{comp\_act\_c}$ are the active current flows through the three phases of the APF 112. The amplitudes of the current flowing through the APF 112, $I_{comp\_a}$, $I_{comp\_b}$, $I_{comp\_c}$, satisfy:

$$I_{comp\_act\_a} = I_{act\_a} - I_{grid}$$

$$I_{comp\_act\_b} = I_{act\_b} - I_{grid}$$

$$I_{comp\_act\_c} = I_{act\_c} - I_{grid} \quad (22)$$

where $I_{grid}$ is the amplitude of the active current of grid 103 after compensation, which is the same for the three phases. When there is net power injected into or flowing out of the APF 112, $I_{grid}$ will not equal to $(I_{act\_a} + I_{act\_b} + I_{act\_c})/3$. The amplitudes of the current flowing through the APF 112 still satisfy equation (22). In this case, the net power injected into or flowing out of the APF 112 is:

$$P_{net} = 0.5V_{pcc\_a}I_{comp\_act\_a} + 0.5V_{pcc\_b}I_{comp\_act\_b} + 0.5V_{pcc\_c}I_{comp\_act\_c} \quad (23)$$

At 412, the firing angles of the H-bridges 203 are determined. The voltage references ($v_{n\_reference\_a}$, $v_{n\_reference\_b}$, $v_{n\_reference\_c}$) for the multilevel inverter 115 to compensate each order of harmonics (n>1) can be obtained based on $i_{h\_n\_a}$, $i_{h\_n\_b}$ and $i_{h\_n\_c}$ and $Z_{comp}$ at that harmonic frequency, where:

$$V_{n-reference\_a} = i_{h\_n\_a} Z_{comp}$$

$$V_{n-reference\_b} = i_{h\_n\_b} Z_{comp}$$

$$V_{n-reference\_c} = i_{h\_n\_c} Z_{comp} \quad (24)$$

Then, $a_{n\_reference}$ and $b_{n\_reference}$ can be derived based on $V_{reference}$. However, in the unbalanced case, the calculated voltage reference $a_{n\_reference}$ and $b_{n\_reference}$ for the multilevel inverter 115 are different for the different phases. Thus, they need to be calculated separatedly. In addition, since the power system is unbalanced, triple-n orders of harmonics are non-zero, which should also be compensated. Thus, the harmonics that need to be mitigated in the unbalanced case are all odd harmonics. Thus, the firing angles $\alpha_{i1}$ and $\alpha_{i2}$ of each H-bridge 203 in the cascaded multilevel inverter 115 are given by:

$$\frac{2V_{dc}}{\pi}[\sin(\alpha_{12}) - \sin(\alpha_{11}) + \sin(\alpha_{22}) - \sin(\alpha_{21}) \ldots \quad (25)$$

$$\sin(\alpha_{m2}) - \sin(\alpha_{m1})] = a_{1-reference\_a}$$

$$\frac{2V_{dc}}{\pi}[\cos(\alpha_{11}) - \cos(\alpha_{12}) + \cos(\alpha_{21}) - \cos(\alpha_{22}) \ldots$$

$$\cos(\alpha_{m1}) - \cos(\alpha_{m2})] = b_{1-reference\_a}$$

$$\frac{2V_{dc}}{3\pi}[\sin(3\alpha_{12}) - \sin(3\alpha_{11}) + \sin(3\alpha_{22}) - \sin(3_{21}) \ldots$$

$$\sin(3\alpha_{m2}) - \sin(3\alpha_{m1})] = a_{3-reference\_a}$$

$$\frac{2V_{dc}}{3\pi}[\cos(3\alpha_{11}) - \cos(3\alpha_{12}) + \cos(3\alpha_{21}) - \cos(3\alpha_{22}) \ldots$$

$$\cos(3\alpha_{m2}) - \cos(3\alpha_{m1})] = b_{3-reference\_a}$$

Here, only the firing angles calculation of phase A is shown. For phase B and phase C, the same equations can be used except that the voltage references are different. An intelligent algorithm such as, e.g., a genetic algorithm or other appropriate mathematic method can be used to obtain the firing angles $\alpha_{i1}$ and $\alpha_{i2}$ of each H-bridge 203 to control the multilevel inverter 115. At 415, the operation of the multilevel inverter 115 is adjusted based upon the firing angles and the process can return to 403 for subsequent monitoring and adjustment of the APF 112.

Figure 5:
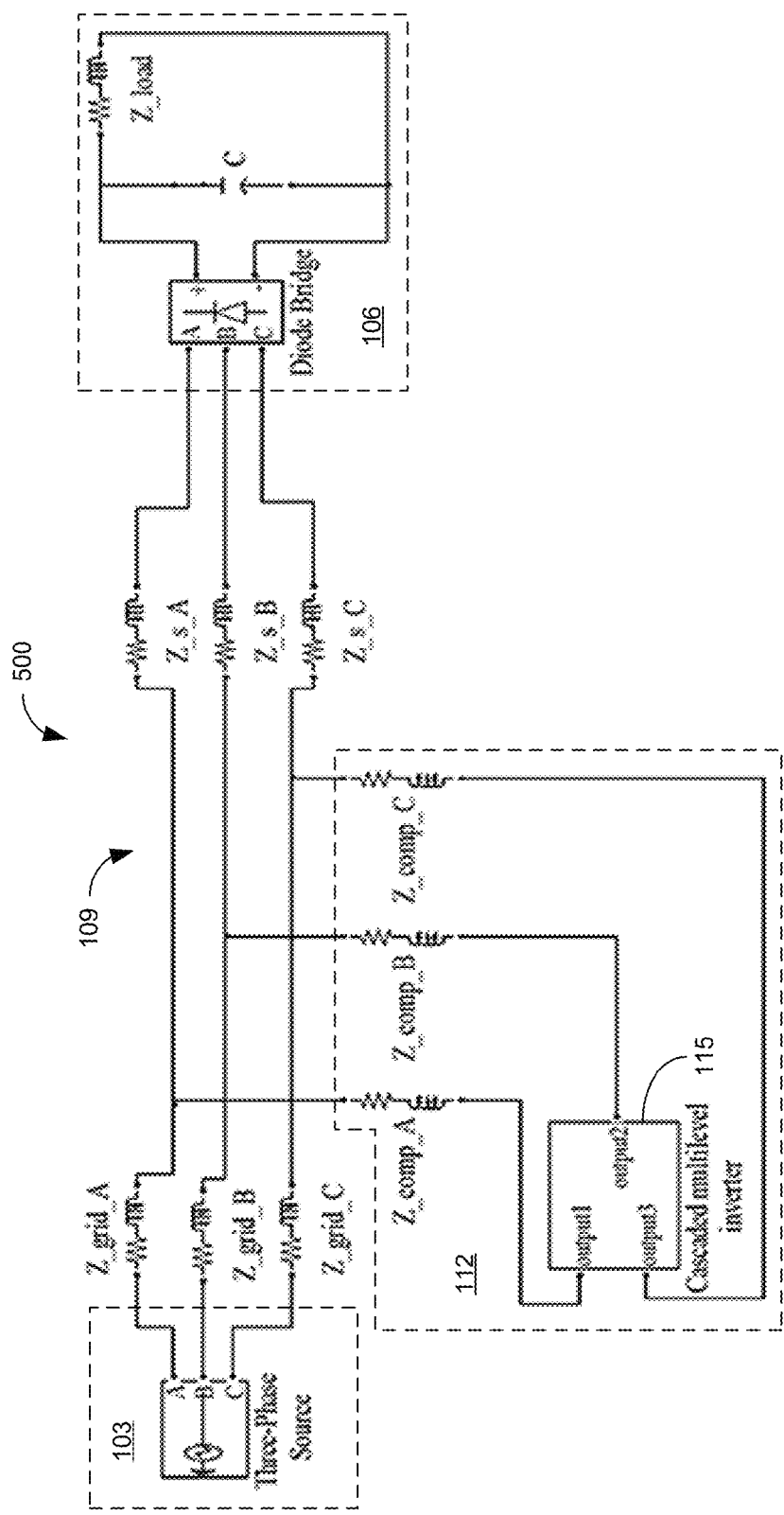
FIG. 5 is a schematic representation of an example of a Matlab/Simulink model power system topology including the APF of FIG. 1 in accordance with various embodiments of the present disclosure.

Referring to FIG. 5, shown is an example of a Matlab/Simulink model 500 of a cascaded multilevel inverter 115 based active power filter (APF) 112 that was used for simulation and testing of the switching angle control technique. In the example of FIG. 5, the multilevel inverter 115 includes four H-bridges 203 (FIG. 2) per phase in an ungrounded Y-configuration. After the firing angle and conduction angle of each H-bridge 203 of the multilevel inverter 115 were acquired, simulations were carried out based on the Matlab/Simulink model shown in FIG. 5. In FIG. 5, each phase 115a/115b/115c of the cascaded multilevel inverter 115 includes four H-bridges 203 having 9-levels, and their switching frequency was 60 Hz.

In a balanced case, the peak line-to-line grid voltage was 400V, the grid voltage frequency was 60 Hz, grid impedances (Z_grid_A, Z_grid_B, and Z_grid_C) were 0.10 and 1 mH for each phase and filter impedances (Z_comp_A, Z_comp_B, and Z_comp_C) were 0.10 and 2 mH for each phase. The DC-link voltage for each H-bridge 203 in the multilevel inverter 115 was 100V. The non-linear load 106 included a diode bridge; a 100 uF capacitor (C) and a 10 Ω resistor in series with a 10 mH inductor (Z_load). The impedance in each phase between the APF 112 and the nonlinear load 106 was also represented as Z_s_A, Z_s_B, and Z_s_C having a 0.1Ω and 3 mH inductor in series. Since the currents of the three phases only differ in phases under the balanced condition, the grid current ($i_{grid}$) of one phase is sufficient to illustrate the characteristics of the grid currents.

Figure 6A:
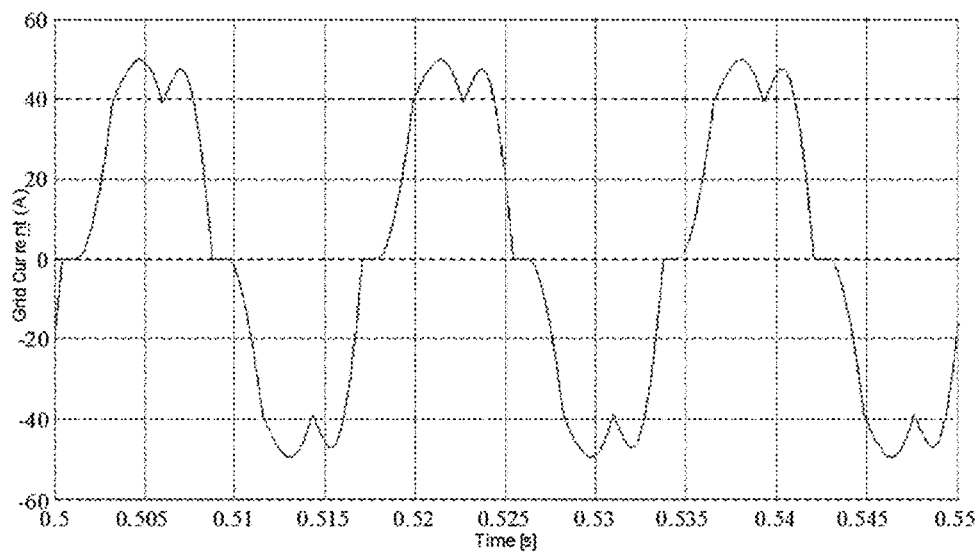
FIGS. 6A through 6D are graphs illustrating grid current compensation effects using the switching angle control under balanced conditions in accordance with various embodiments of the present disclosure.

Referring now to FIG. 6A, shown is a plot of an example of grid current waveform of the phase A without compensation. The grid current ($i_{grid}$) contains fundamental, reactive and harmonic components. To obtain the firing and conduction angles of each H-bridge 203 (FIG. 2) of the multilevel inverter 115 (FIG. 5), the following parameters were used to implement the genetic algorithm:
Population: 100
Maximum number of generations: 5000
Crossover rate: 0.8
Mutation rate: 0.1

Figure 6B:
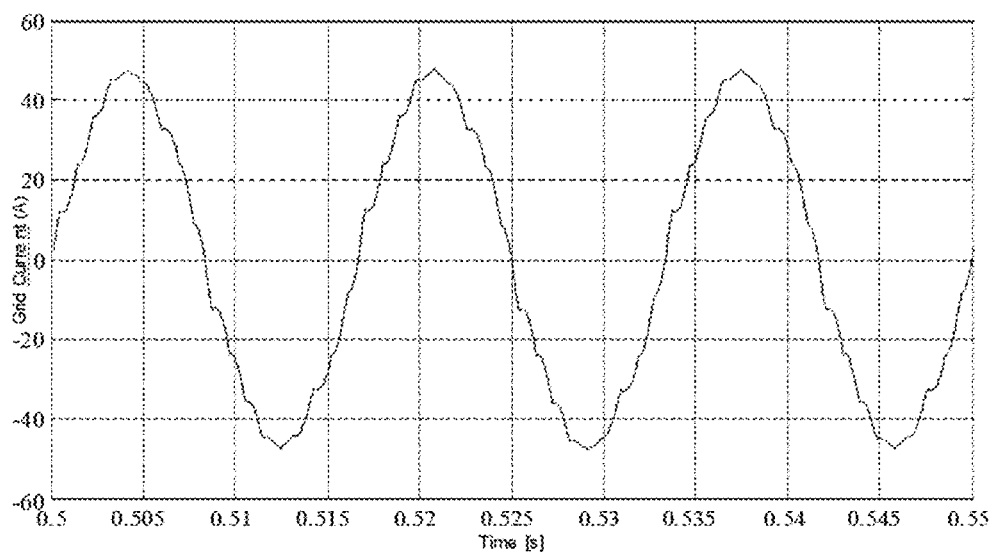
Figure 6C:
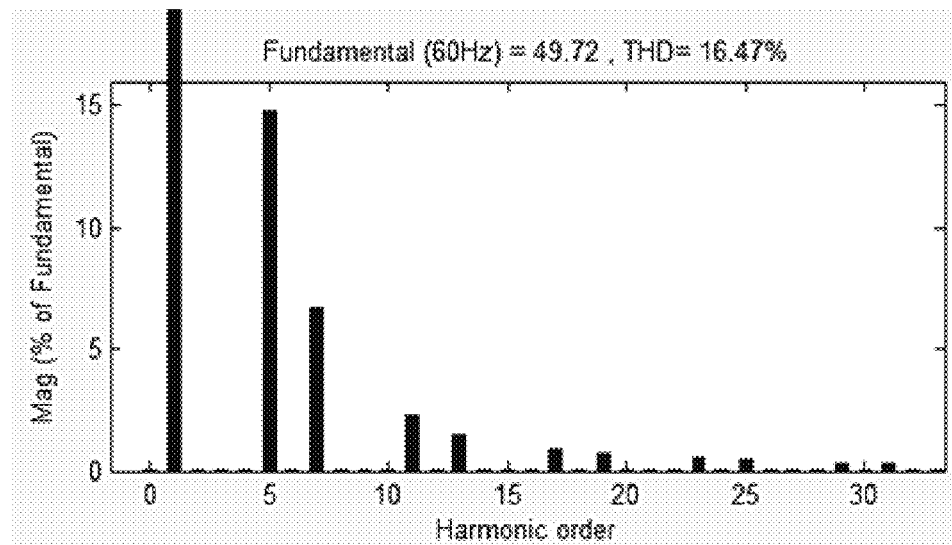
Figure 6D:
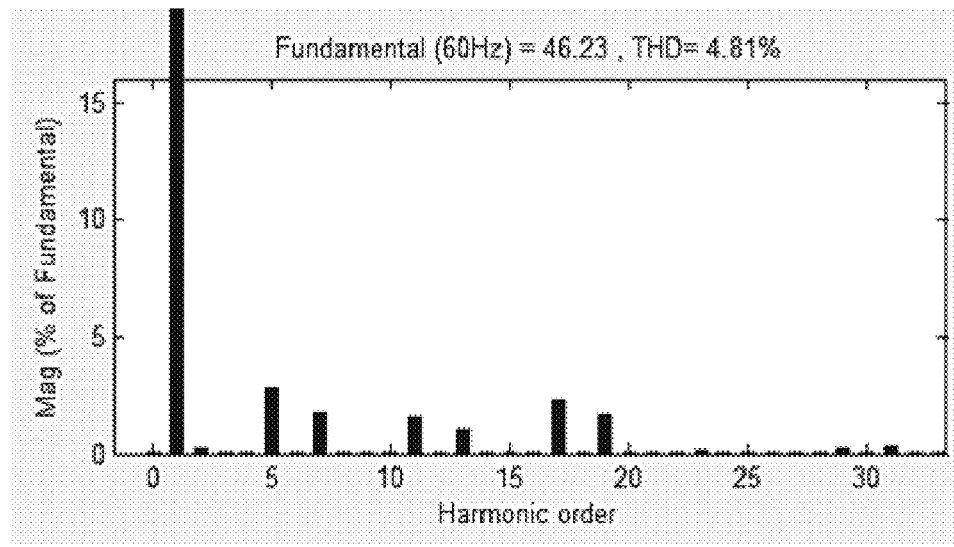

The objective function is given by equation (13) with m=4. The control firing angles, $\alpha_{i1}$ and $\alpha_{i2}$, acquired for the four H-bridges 203 of each phase of the multilevel inverter 115 through the genetic algorithm were 0.52 and 2.59, 0.0913 and 2.8524, 1.5812 and 1.6026, 0.8462 and 2.936 (in radians), respectively. Active power filtering is provided by implementing these firing angles in the multilevel inverter 115. With each H-bridge 203 switching at 60 Hz, the multilevel inverter 115 can be used to compensate harmonics and reactive power simultaneously. The grid current waveform of phase A after compensation is shown in FIG. 6B, and when compared to the current waveform of FIG. 6A it can be seen to be much more sinusoidal. The spectrums of the grid current including the 60 Hz fundamental frequency before and after compensation are shown in FIG. 6C and FIG. 6D, respectively. As shown in FIGS. 6C and 6D, without compensation, the total harmonic distortion (THD) of the grid current was 16.47% whereas the THD of grid current after compensation was reduced to 4.81%. This illustrates that the multilevel inverter 115 based APF 112 successfully compensated for the harmonic currents. In addition, the displacement power factor before compensation was 0.8942 and increased to 0.9999 after compensation, which shows that the reactive power was also successfully compensated using the switching angle control technique.

Comparing FIGS. 6C and 6D, it can also be seen that while some high order harmonics were increased after compensation (e.g., the 17th and 19th harmonics), other higher order harmonics (e.g., the 23rd, 25th, 29th and 31st) decreased after compensation. This may be attributed to the cascaded multilevel inverter 115 having four H-bridges 203, which allows for compensation of the fundamental, 5th, 7th and 11th order of harmonics as can be seen from equations (11) and (13). Additional cascaded H-bridges 203 can allow for controlled compensation of additional higher order harmonics. The higher order harmonics can also be filtered out using passive filters, especially when the number of cascaded H-bridges 203 is large.

Figure 7A:
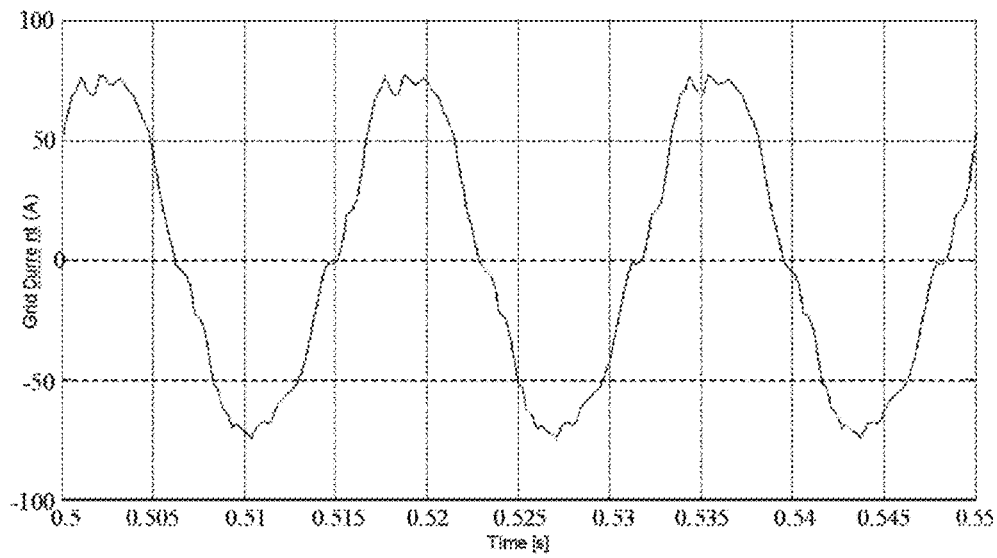
FIGS. 7A and 7B are graphs illustrating grid current compensation using a conventional control method in accordance with various embodiments of the present disclosure.
Figure 7B:
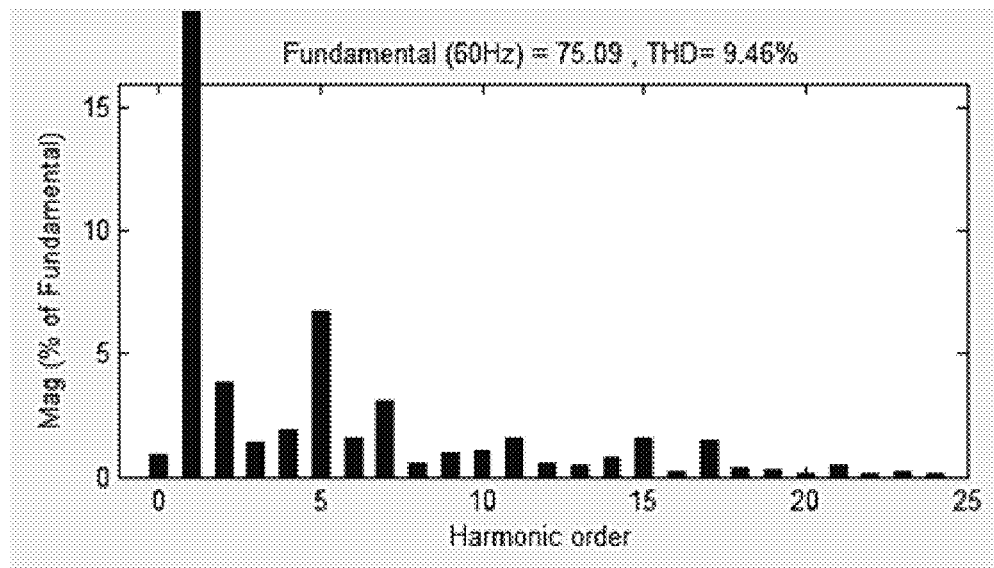

FIGS. 7A and 7B show the waveform and spectrum, respectively, of the grid current ($i_{grid}$) after compensation with a conventional time domain control method that used a prediction based current reference generation method that was similar to the one proposed in "A Novel Simple Prediction Based Current Reference Generation Method for an Active Power filter" by Routimo et al., Proc. of Power Electronics Specialists Conference (PESC), vol. 4, pp. 3125-3220 (2004). The active power filter used was a four H-bridge cascaded multilevel inverter and the switching frequency was also 60 Hz. From FIGS. 7A and 7B, it can be seen that this conventional time domain control method only reduced THD to 9.46%, almost twice that of FIG. 6D. Additionally, the amplitude of the grid current was increased greatly and triple-n orders of harmonics were induced, which will result in additional power losses. The displacement power factor was reduced to 0.773, which means that the reactive current was actually increased rather than decreased. In conclusion, the conventional technique was not suitable for operation at low switching frequency, especially when the number of cascaded H-bridges 203 was small. These simulation results are in accordance with the analysis that the conventional control techniques need high switching frequencies to have good performance; however this will result in increased switching losses.

Figure 8A:
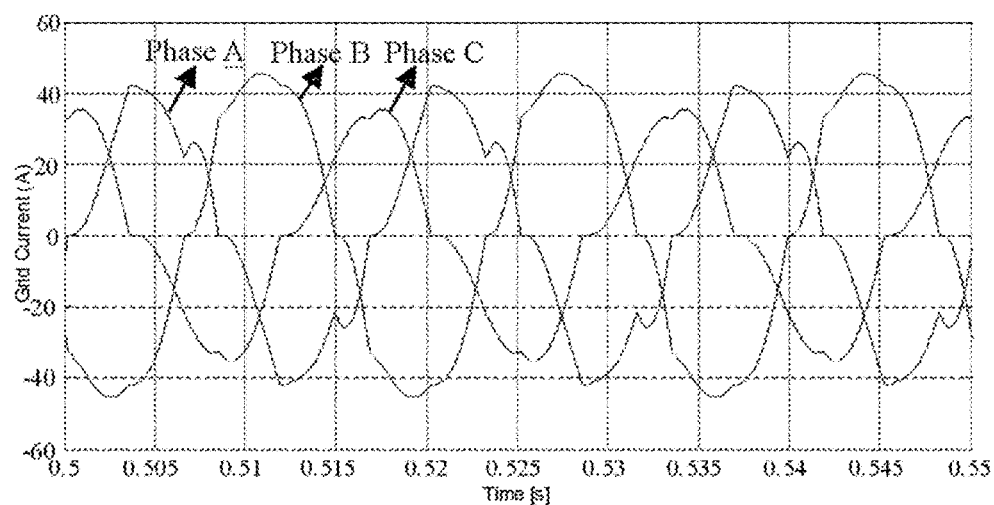
FIGS. 8A and 8B are graphs illustrating grid current compensation effects using the switching angle control under unbalanced conditions in accordance with various embodiments of the present disclosure.

In the unbalanced case, some parameters were changed in the Matlab/Simulink model 500 of FIG. 5 that was used for the balanced case. The impedances Z_s_A, Z_s_B, and Z_s_C were changed to 0.10 and 1 mH, 10 and 5 mH, 30 and 15 mH, respectively, to produce an unbalanced load condition. The filter impedances (Z_comp_A, Z_comp_B, and Z_comp_C) were changed to 0.10 and 3 mH for all three phases. FIG. 8A is an example of a plot of the grid currents ($i_{grid}$) for all three phases without compensation. Detailed information about the grid currents was obtained through Fourier analysis of grid currents, and is shown in TABLE 1. From FIG. 8A and TABLE 1, it can be seen that the grid currents not only contain harmonics and reactive components, but also are unbalanced between the three phases.

TABLE 1

Unbalanced grid currents without compensation

|  | Phase A | Phase B | Phase C |
| --- | --- | --- | --- |
| Peak of fundamental | 38.68 | 47.11 | 32.78 |
| $3^{th}$ harmonics | 8.97% | 2.92% | 12.94% |
| $5^{th}$ harmonics | 7.41% | 3.89% | 8.12% |
| $7^{th}$ harmonics | 5.44% | 4.68% | 1.95% |
| $9^{th}$ harmonics | 4.73% | 2.66% | 2.02% |
| $11^{th}$ harmonics | 1.36% | 1.33% | 1.39% |
| THD | 13.9% | 7.5% | 15.65% |
| Displacement Power Factor | 0.9707 | 0.8634 | 0.81 |

The active current to be supplied by the grid 103 (FIG. 5) was chosen to be the maximum active phase current drawn by the load 106 (FIG. 5) of the three phases. The parameters used for the genetic algorithm were the same as the parameters used in balanced case. The objective function is given by equation (15) with m=4. Using the genetic algorithm, the firing angles of the four H-bridges 203 (FIG. 2) were obtained and are shown in TABLE 2.

TABLE 2

Switching angles for unbalanced compensation

|  |  | Firing angles | | |
| --- | --- | --- | --- | --- |
|  |  | Phase A | Phase B | Phase C |
| H-bridge 1 | $\alpha_{i1}$ | 0.903 | 1.455 | 0.7365 |
|  | $\alpha_{i2}$ | 2.922 | 2.877 | 2.7925 |
| H-bridge 2 | $\alpha_{i1}$ | 0.453 | 0.185 | 0.1872 |
|  | $\alpha_{i2}$ | 1.355 | 2.4 | 3.0081 |
| H-bridge 3 | $\alpha_{i1}$ | 1.204 | 0.6122 | 1.4523 |
|  | $\alpha_{i2}$ | 2.316 | 1.6886 | 2.4749 |
| H-bridge 4 | $\alpha_{i1}$ | 0.356 | 0.7204 | 0.8823 |
|  | $\alpha_{i2}$ | 2.924 | 2.9291 | 1.7522 |

Figure 8B:
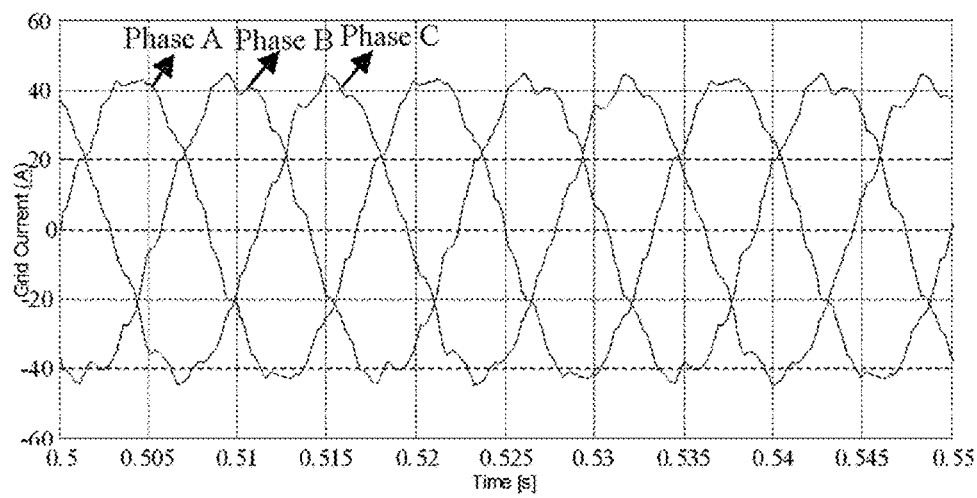

FIG. 8B shows the grid currents ($i_{grid}$) for all three phases after compensation and TABLE 3 gives detailed information of the three phase grid currents after compensation. Comparing FIG. 8A and TABLE 1 with FIG. 8B and TABLE 3, it can be seen that the multilevel inverter 115 not only compensates reactive and harmonic currents, but also balances the unbalanced load successfully. Since the three phases are unbalanced, there are triple-n orders of harmonics that the APF 112 provides compensation for. Thus, the four H-bridges 203 are controlled to compensate for only the fundamental, 3rd, 5th and 7th order of harmonics. As in the balanced case, higher order of harmonics may be increased, which can be taken care of with passive filters.

TABLE 3

Grid currents with unbalanced compensation

|  | Phase A | Phase B | Phase C |
| --- | --- | --- | --- |
| Peak of fundamental | 43.17 | 42.83 | 42.18 |
| $3^{th}$ harmonics | 0.2% | 0.73% | 0.79% |
| $5^{th}$ harmonics | 1.03% | 2.2% | 1.22% |
| $7^{th}$ harmonics | 3.06% | 3.45% | 1.68% |
| $9^{th}$ harmonics | 1.65% | 2.39% | 3.67% |
| $11^{th}$ harmonics | 1.53% | 3.03% | 2.53% |
| THD | 4.44% | 6.08% | 5.29% |
| Displacement Power Factor | 0.9999 | 0.9993 | 0.9998 |

Figure 9A:
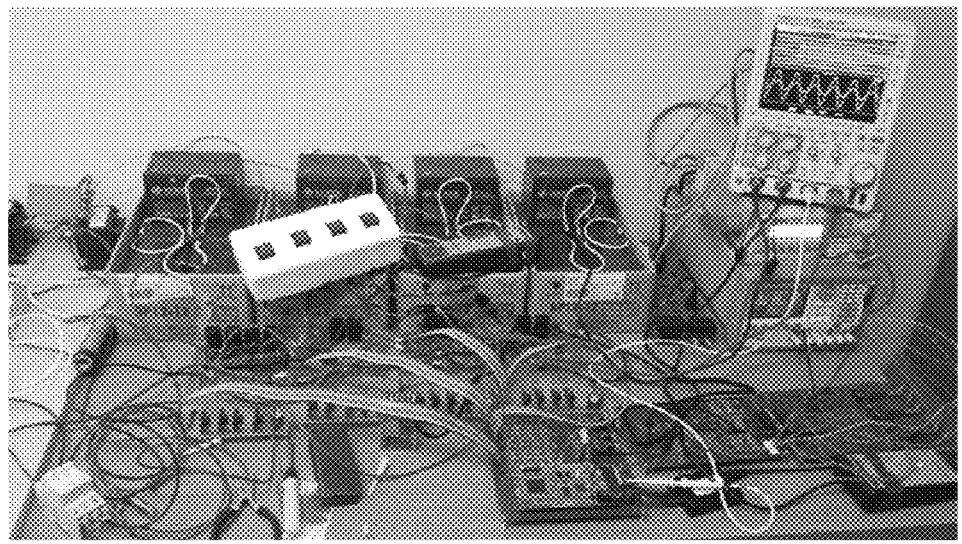
FIGS. 9A and 9B are an image and schematic diagram of an APF of FIG. 1 using the switching angle control in accordance with various embodiments of the present disclosure.
Figure 9B:
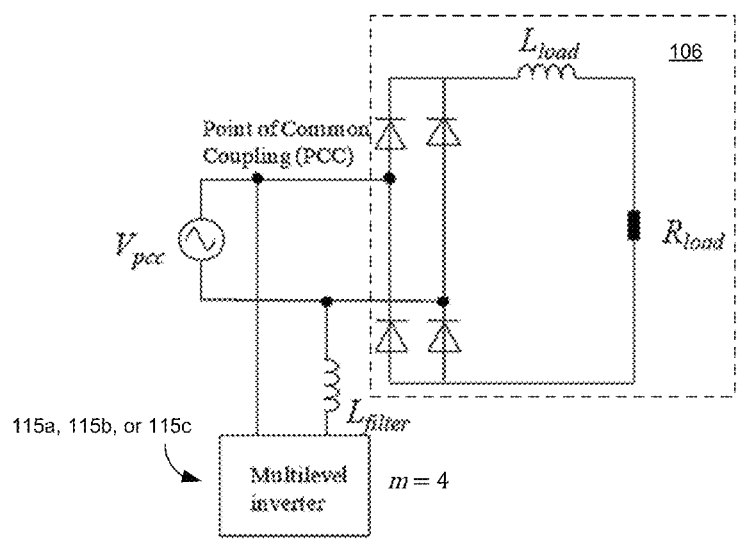

Referring next to FIG. 9A, shown is an experimental setup that was built and used for validation of the simulation results. FIG. 9B shows a schematic representation of the experimental prototype of FIG. 9A. A three-phase AC power supply to represent the grid 103 of FIGS. 1 and 4. Because the experimental setup was a single phase implementation, only one phase of the AC power supply was used. During the experimental testing, the load 106 (FIGS. 1 and 4) was provided by a diode bridge in series with an inductor and resistor, whose inductance and resistance were 17 mH and 20Ω, respectively. The multilevel inverter 115a/115b/115c of FIG. 2 included four H-bridges 203 connected in series. It is connected to the grid 103 through an inductor, $L_{filter}$, with an inductance of 6 mH. The DC voltage, $V_{dc}$, of 50.7 V was provided by five series connected batteries to the H-bridges 203 of multilevel inverter 115a/115b/115c.

Figure 10A:
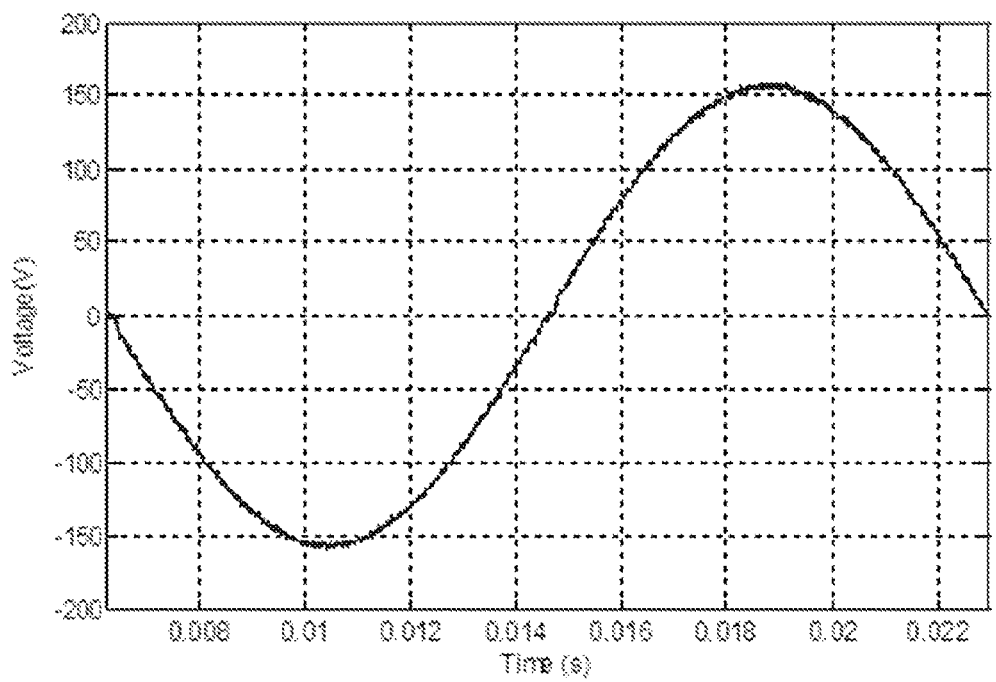
FIGS. 10A through 10E and 11A through 11F are graphs illustrating grid current compensation effects of the APF of FIGS. 9A and 9B using the switching angle control in accordance with various embodiments of the present disclosure.
Figure 10B:
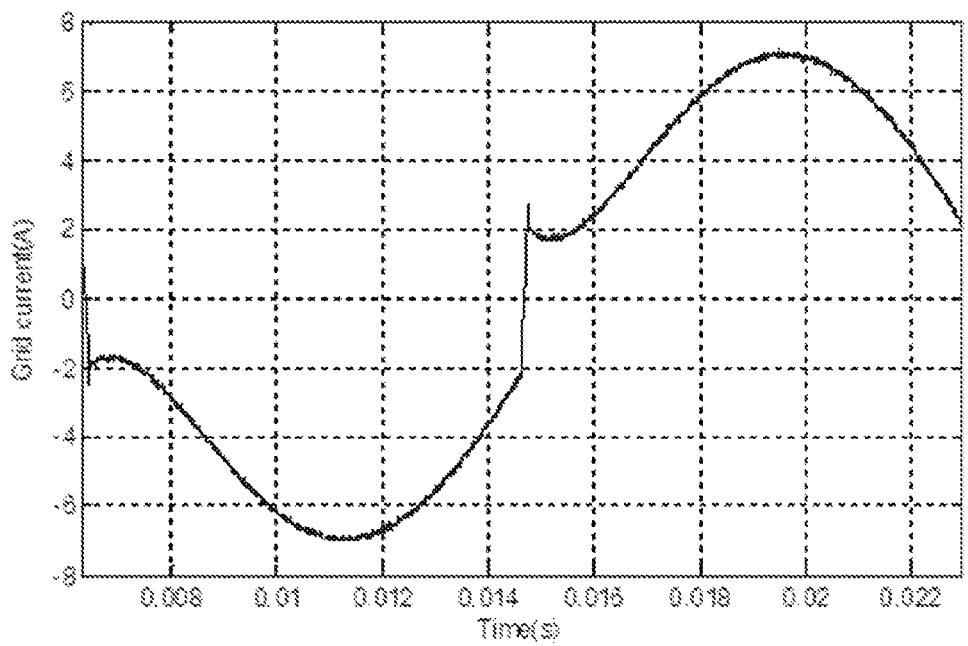

Referring to FIGS. 10A and 10B, shown are the grid voltage and grid current, respectively, measured at the point of common coupling (PCC) with the multilevel inverter 115a/115b/115c for active power filtering not connected. It can be seen from FIG. 10A that the gird voltage was sinusoidal. The current spectrum was obtained by applying a fast Fourier transform (FFT) to the grid current of FIG. 10B. The amplitude and phase information for the fundamental current and the 3rd order, 5th order and 7th order harmonic currents of the grid current are listed in TABLE 4. The phase was referenced with respect to the grid voltage.

TABLE 4

Spectrum of grid current without compensation

| Order | I_grid (A) | Fund. phase (deg) |
| --- | --- | --- |
| 1 | 7.06 | −11.13 |
| 3 | 0.64 | 40.88 |
| 5 | 0.47 | 21.88 |
| 7 | 0.35 | 11.21 |

Figure 10C:
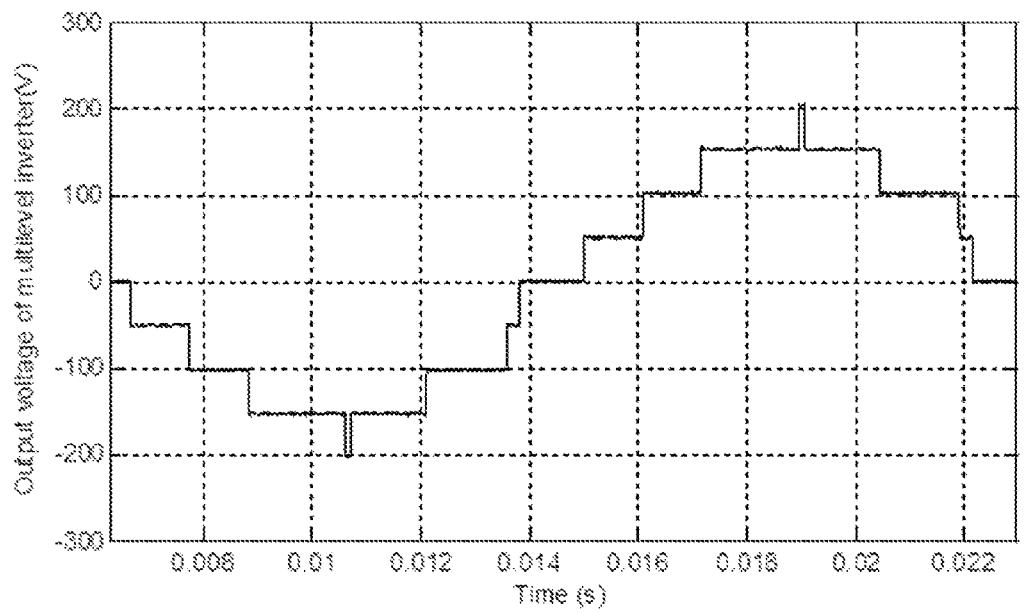

Based on the spectrum of the PCC voltage ($V_{pcc}$) and grid current ($i_{grid}$), the switching angles, $\alpha_{i1}$ and $\alpha_{i2}$, of the four H-bridges 203 (FIG. 2) of the multilevel inverter 115a/115b/115c were calculated to be 0.14418 and 2.8445, 0.54935 and 2.7466, 0.95261 and 2.1938, 1.6243 and 1.6725 respectively. Using these firing angles, the multilevel inverter 115a/115b/115c generated the output waveform shown in FIG. 10C.

Figure 10D:
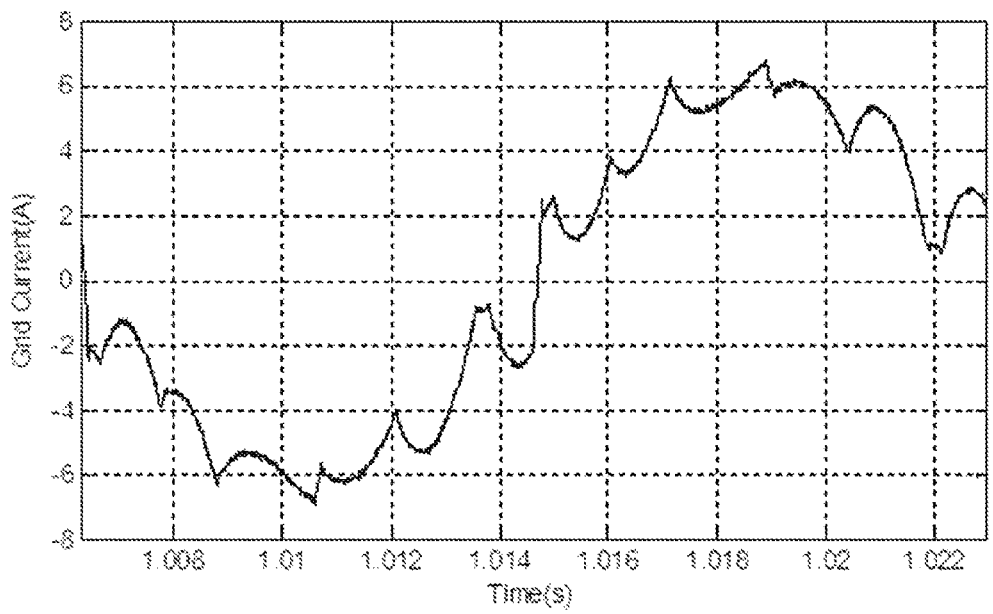
Figure 10E:
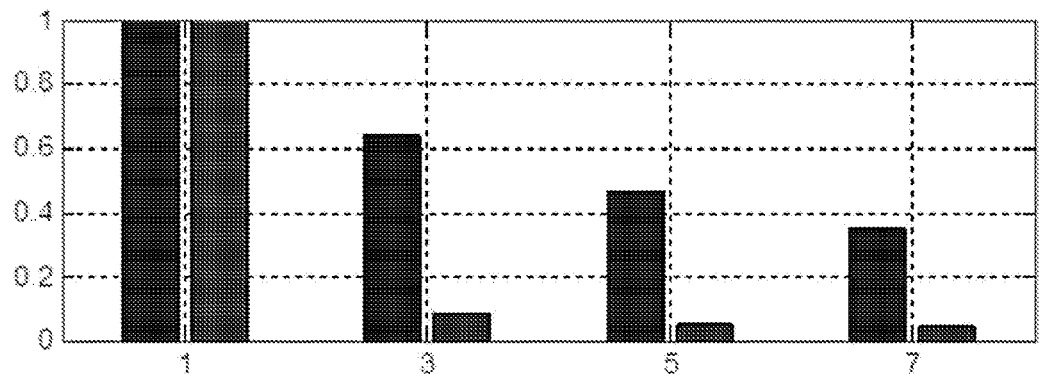

Referring to FIG. 10D, shown is the resulting grid current ($i_{grid}$) with the multilevel inverter 115a/115b/115c connected at the PCC. Harmonic currents were obtained by applying a FFT to the grid current of FIG. 10D with the active power filtering. TABLE 5 lists the amplitude and phase information for the fundamental current and 3rd order, 5th order and 7th order harmonic currents. The phase was referenced with respect to the grid voltage.

TABLE 5

Spectrum of grid current with compensation

| Order | I_grid (A) | Fund. phase (deg) |
|---|---|---|
| 1 | 6.46 | −0.83 |
| 3 | 0.09 | −46.43 |
| 5 | 0.04 | 217.09 |
| 7 | 0.04 | 198.50 |

FIG. 10D shows a comparison of the fundamental and 3rd order, 5th order and 7th order harmonics of the grid current with (right bar) and without (left bar) active power filtering using the multilevel inverter 115a/115b/115c. Comparing TABLES 4 and 5, it can be seen the third order harmonic current was reduced by 86%, the fifth order harmonic current was reduced by 91.5%, and the seventh order harmonic current was reduced by 88.6%, which illustrates the effective compensation of the harmonics using the active power filtering. In addition, the phase difference between fundamental grid current and the grid voltage was reduced from 11.13 degree to 0.83 degree, which indicates that the reactive power was also effectively compensated.

Figure 11A:
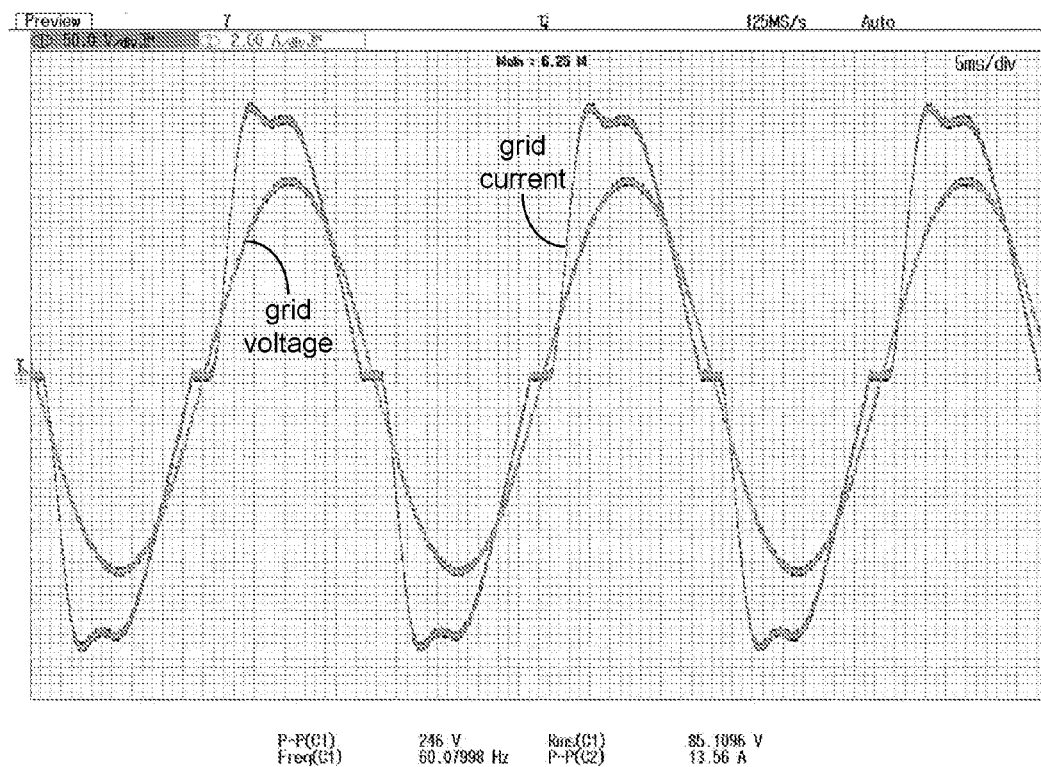
Figure 11B:
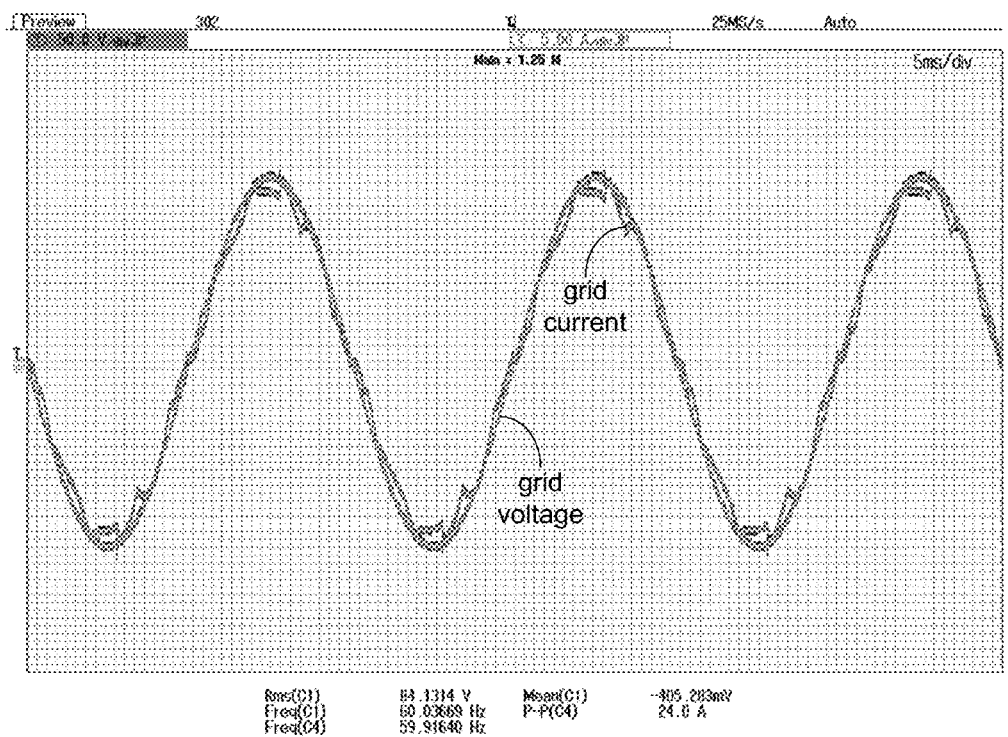
Figure 11C:
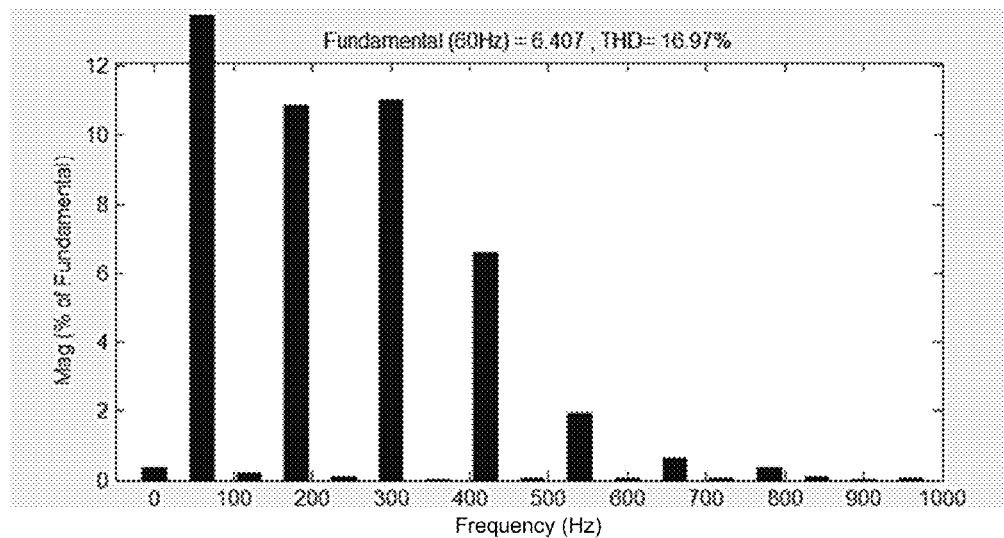
Figure 11D:
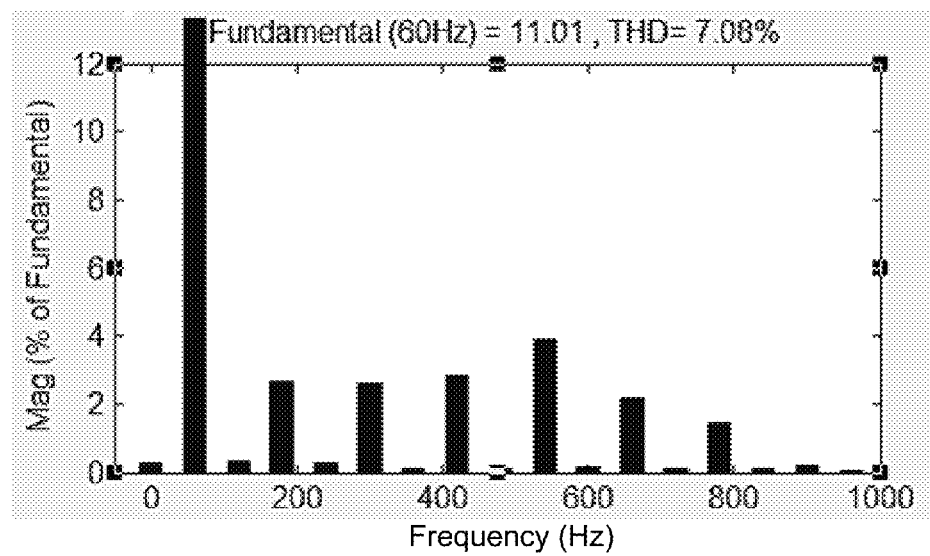

FIGS. 11A through 11F further illustrate the effectiveness of the switching angle control technique. FIG. 11A shows the concurrently measured grid voltage and grid current without active power filtering. It can be seen that the gird voltage was sinusoidal, while the grid current was distorted by the harmonic currents. FIG. 11A shows the concurrently measured grid voltage and grid current with active power filtering using the multilevel inverter 115a/115b/115c. As can be seen, there was a visible reduction in the distortion of the grid current. The spectrums of the grid current including the 60 Hz fundamental frequency without and with compensation are shown in FIG. 11C and FIG. 11D, respectively. The THD of the grid current was reduced from 16.97% to 7.08% indicating an improvement in the harmonic content, and the power factor went from 11.8 degrees to 0.6 degrees indicating compensation of the reactive load.

Figure 11E:
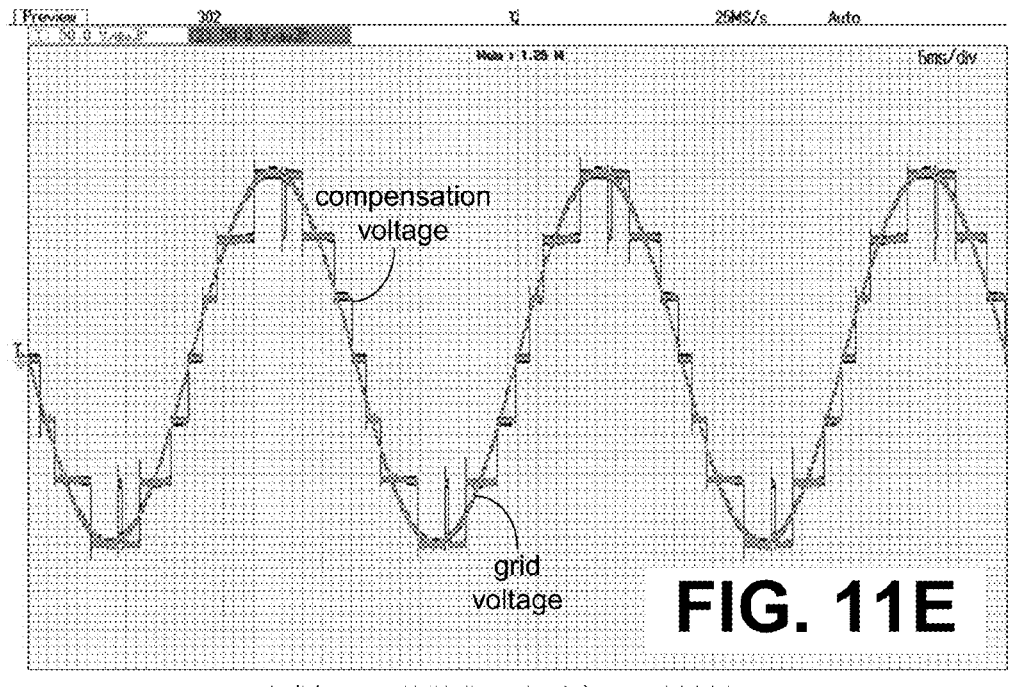
Figure 11F:
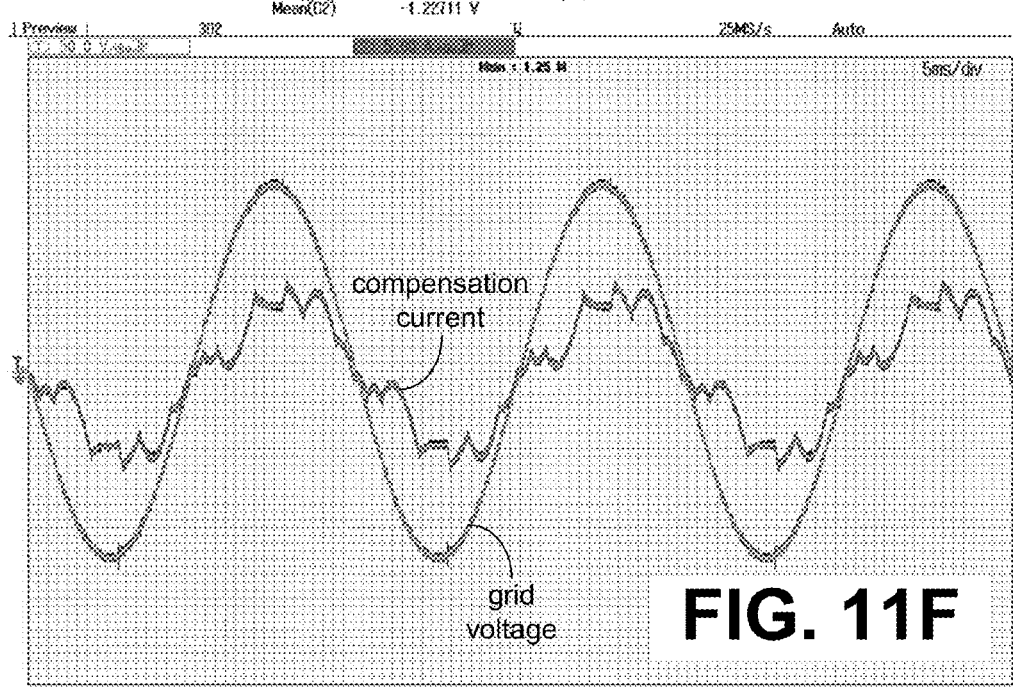

FIGS. 11E and 11F illustrate measurements of the compensation voltage and compensation currents provided by the multilevel inverter 115a/115b/115c, respectively. Power was provided from the battery of the multilevel inverter 115a/115b/115c to the power grid, which resulted in the 60 Hz fundamental current increasing from 6.407 A to 11.01 A. As previously discussed, the four H-bridges 203 (FIG. 2) allowed for controlled compensation of the 3rd, 5th and 7th order harmonics. Higher order harmonics can be compensated for by including additional H-bridges 203 in the multilevel inverter 115a/115b/115c. These test results illustrate that the switching angle control of the multilevel inverter 115a/115b/115c can provide simultaneous reactive power compensation, harmonic compensation and real power generation for a power system.

Figure 12:
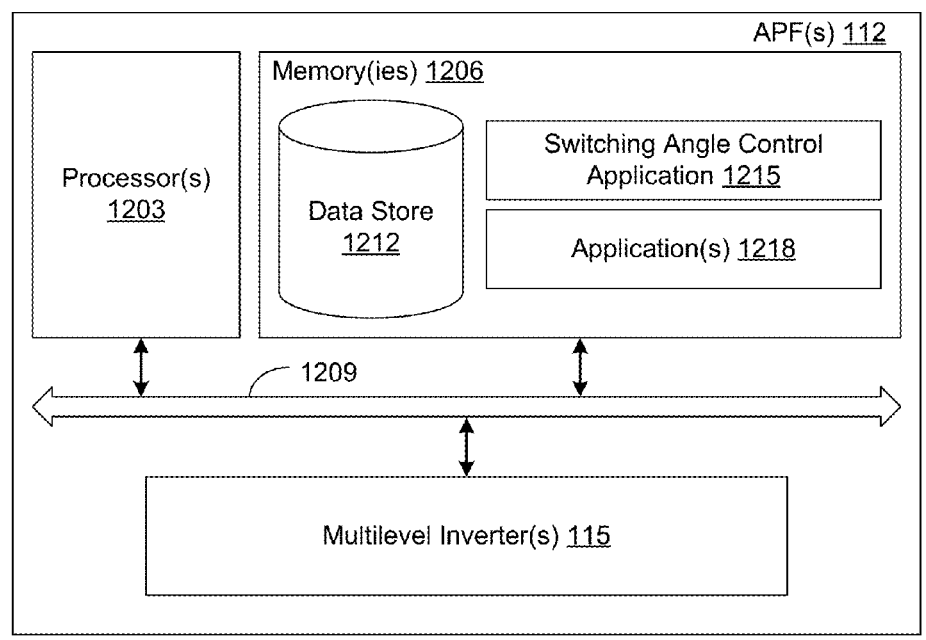
FIG. 12 is a schematic block diagram of an APF of FIG. 1 in accordance with various embodiments of the present disclosure.

With reference to FIG. 12, shown is a schematic block diagram of an example of an active power filter (APF) 112 comprising a three-phase cascaded multilevel inverter 115 according to various embodiments of the present disclosure. The APF 112 can include at least one processor circuit, for example, having a processor 1203 and a memory 1206, both of which are coupled to a local interface 1209. To this end, the APF 112 can comprise, for example, at least an active filter system, which may be used to compensate for reactive, harmonic and/or unbalanced effects on a power system. The local interface 1209 can comprise, for example, a data bus with an accompanying address/control bus or other bus structure as can be appreciated. The processor 1203 can communicate with, e.g., control circuitry of a multilevel inverter 115 via the local interface 1209 to control switching of H-bridges of the cascaded multilevel inverter 115.

Stored in the memory 1206 are both data and several components that are executable by the processor 1203. In particular, stored in the memory 1206 and executable by the processor 1203 may be a switching angle control application 1215 and/or other applications 1218. Also stored in the memory 1206 can be a data store 1212 for storing measured data received by the APF 112, control parameters determined by the switching angle control application 1215 and other data. In addition, an operating system can be stored in the memory 1206 and executable by the processor 1203.

The switching angle control application 1215 can be configured to implement one or more aspects of the switching angle control technique discussed herein. For example, the switching angle control application 1215 can be executed by the processor 1203 to implement some or all of the example of FIG. 4. Although the flow chart of FIG. 4 shows a specific order of execution, it is understood that the order of execution may differ from that which is depicted. For example, the order of execution of two or more blocks may be scrambled relative to the order shown. Also, two or more blocks shown in succession in FIG. 4 may be executed concurrently or with partial concurrence. Further, in some embodiments, one or more of the blocks shown in FIG. 4 may be skipped or omitted (in favor, e.g., measured travel times). In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

It is understood that there can be other applications that are stored in the memory 1206 and are executable by the processor 1203 as can be appreciated. Where any component discussed herein is implemented in the form of software, any one of a number of programming languages can be employed such as, for example, C, C++, C#, Objective C, Java®, JavaScript®, Perl, PHP, Visual Basic®, Python®, Ruby, Delphi®, Flash®, or other programming languages.

A number of software components are stored in the memory 1206 and are executable by the processor 1203. In this respect, the term "executable" means a program file that is in a form that can ultimately be run by the processor 1203. Examples of executable programs can be, for example, a compiled program that can be translated into machine code in a format that can be loaded into a random access portion of the memory 1206 and run by the processor 1203, source code that can be expressed in proper format such as object code that is capable of being loaded into a random access portion of the memory 1206 and executed by the processor 1203, or source code that can be interpreted by another executable program to generate instructions in a random access portion of the memory 1206 to be executed by the processor 1203, etc. An executable program can be stored in any portion or component of the memory 1206 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 1206 is defined herein as including both volatile and nonvolatile memory and data storage components. Volatile components are those that do not retain data values upon loss of power. Nonvolatile components are those that retain data upon a loss of power. Thus, the memory 1206 can comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM can comprise, for example, static random access memory (SRAM), dynamic random access memory (DRAM), or magnetic random access memory (MRAM) and other such devices. The ROM can comprise, for example, a programmable read-only memory (PROM), an erasable programmable read-only memory (EPROM), an electrically erasable programmable read-only memory (EEPROM), or other like memory device.

Also, the processor 1203 can represent multiple processors 1203 and the memory 1206 can represent multiple memories 1206 that operate in parallel processing circuits, respectively. In such a case, the local interface 1209 can be an appropriate network that facilitates communication between any two of the multiple processors 1203, between any processor 1203 and any of the memories 1206, or between any two of the memories 1206, etc. The local interface 1209 can comprise additional systems designed to coordinate this communication, including, for example, performing load balancing. The processor 1203 can be of electrical or of some other available construction.

Although the switching angle control application 1215, application(s) 1218, and other various systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The switching angle control technique of certain embodiments of the present disclosure can be implemented in hardware, software, firmware, or a combination thereof. For example, the switching angle control technique can be implemented in software or firmware that is stored in a memory and that is executed by a suitable instruction execution system. If implemented in hardware, as in an alternative embodiment, the switching angle control technique can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Also, any logic or application described herein, including the switching angle control application 1215 and/or application(s) 1218, that comprises software or code can be embodied in any non-transitory computer-readable medium for use by or in connection with an instruction execution system such as, for example, a processor 1203 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including, for example, static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

In this disclosure, active power filtering utilizing a control technique using direct asymmetric switching angle control for cascaded multilevel inverters was disclosed. This switching angle control technique is distinct from existing, time domain control strategies in that it works in the frequency domain. Compared with conventional time domain control methods, the switching angle control technique can control specific orders of harmonics to ensure they are in accordance with standards. Additionally, the switching angle control technique may achieve improved frequency domain performance with a much lower switching frequency than traditional control techniques, which can reduce switching loss and increase the efficiency of the power system. The switching angle control technique can also be utilized to balance unbalanced load while simultaneously compensating for harmonics and reactive power. The effectiveness of an APF 112 (FIGS. 1 and 4) using the switching angle control technique was successfully verified in both balanced and unbalanced cases through simulations.

The switching angle control technique may be optimized towards a specific implementation. For example, more time efficient methods can be used to solve the transcendental equations to facilitate closed-loop control in a dynamic grid. The operational state may also be differentiated between transient state operation and steady state operation, where a more robust current reference generation algorithm would be used during transient state operations. An APF 112 using the switching angle control technique can be combined with small passive filters to filter out high order harmonics that are not reduced by the switching angle control technique. The switching angle control technique can be applied to practical power systems to improve the performance of cascaded multilevel inverter 115 based APFs 112 and improve the efficiency of the system. A significant advantage of the switching angle control technique is that it can achieve reactive power compensation/voltage regulation, harmonic compensation, load balancing and real power flow control simultaneously with high energy efficiency. As a result, an APF 112 utilizing this control technique can replace several single function devices to greatly reduce cost.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1% to about 5%, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

The invention claimed is:

1. A grid active power filter, comprising;
a multilevel inverter configured to couple to a distribution network at a point of common coupling (PCC) between a grid and a load, the multilevel inverter comprising a first plurality of H-bridges that are connected in series, each of the first plurality of H-bridges comprising an array of switches coupled to a direct current (DC) source; and
processing circuitry configured to:
control switching of the first plurality of H-bridges based at least in part upon a number of individual harmonic currents drawn by the load; and
determine a firing angle and a conduction angle for each of the first plurality of H-bridges, where the firing angle and the conduction angle are asymmetrical to $\pi 2$, wherein the firing angle is determined based at least in part upon reference voltages corresponding to the number of individual harmonic currents.

2. The grid active power filter of claim 1, wherein individual reference voltages are based upon a corresponding harmonic current of the number of individual harmonic currents and a compensation impedance between the first plurality of H-bridges and the PCC.

3. The grid active power filter of claim 1, wherein the reference voltages comprise a fundamental harmonic reference voltage corresponding to compensation for reactive power drawn by the load.

4. The grid active power filter of claim 1, wherein the first plurality of H-bridges consists of a number of series connected H-bridges defined as m.

5. The grid active power filter of claim 4, wherein the number of individual harmonic currents is based upon the number of series connected H-bridges.

6. The grid active power filter of claim 5, wherein the number of individual harmonic currents does not include triple-n orders of harmonics of a fundamental frequency.

7. The grid active power filter of claim 1, wherein the multilevel inverter comprises a second plurality of H-bridges that are connected in series and a third plurality of H-bridges that are connected in series, where the first, second and third plurality of H-bridges are coupled to different corresponding phases of the distribution network.

8. The grid active power filter of claim 7, wherein the processing circuitry is configured to individually control switching of the first, second and third plurality of H-bridges based at least in part upon individual harmonic currents drawn by the load via the corresponding phase to which the first, second or third plurality of H-bridges are connected to.

9. The grid active power filter of claim 8, wherein the individual harmonic currents includes triple-n orders of harmonics of a fundamental frequency.

10. The grid active power filter of claim 7, wherein switching of the first, second and third plurality of H-bridges compensates for unbalanced loading of the grid by the load.

11. A method, comprising:
determining firing angles for each of a series of single phase H-bridges coupled to a point of common coupling (PCC) between a grid and a load, the firing angles based at least in part upon a number of individual harmonic currents drawn by the load, wherein determining the firing angles comprises determining reference voltages based at least in part upon the individual harmonic currents and a compensation impedance between the series of single phase H-bridges and the PCC, wherein the firing angles are determined based at least in part upon the reference voltages: and adjusting firing of switches of the single phase H-bridges based upon the firing angles.

12. The method of claim 11, wherein the individual harmonic currents are determined from spectral components of a load current supplied during a preceding cycle of a fundamental harmonic of a grid voltage supplied by the grid, and the firing of the switches is adjusted during a current cycle of the fundamental harmonic of the grid voltage.

13. The method of claim 11, wherein the firing angles are determined utilizing a genetic algorithm.

14. The method of claim 11, comprising determining firing angles for each of a second series of single phase H-bridges coupled to the PCC, the second series of single phase H-bridges coupled to a different phase than the series of single phase H-bridges.

15. The method of claim 11, wherein the number of individual harmonic currents comprise a fundamental harmonic and a plurality of lower order harmonics.

16. The method of claim 15, wherein the plurality of lower order harmonics includes fifth and seventh harmonics.

17. A method comprising:
determining firing angles for each of a series of single phase H-bridges coupled to a point of common coupling (FCC) between a grid and a load, the firing angles based at least in part upon a number of individual harmonic currents drawn by the load; wherein determining the firing angles comprises determining reference voltages based at least in part upon the number of individual harmonic currents and a compensation impedance between the series of single phase H-bridges and the PCC, the firing angles being determined based at least in part upon the reference voltages: and
adjusting firing of switches of the single phase H-bridges based upon the firing angles; wherein the number of individual harmonic currents comprise a fundamental harmonic and a plurality of lower order harmonics excluding triple-n orders of harmonics.

18. The method of claim 17, wherein the firing angles are asymmetrical to $\pi/2$.

19. The method claim 17, further comprising determining a conduction angle for each of the series of single phase H-bridges.

20. The method of claim 19, wherein the conduction angle is asymmetrical to $\pi/2$.

* * * * *